(12) United States Patent
Tajiri et al.

(10) Patent No.: US 6,595,858 B1
(45) Date of Patent: Jul. 22, 2003

(54) IMAGE-DISPLAY GAME SYSTEM

(75) Inventors: Satoshi Tajiri, Setagaya-ku (JP); Tsunekazu Ishihara, Chuo-ku (JP)

(73) Assignees: Nintendo Co., Ltd., Kyoto (JP); GAME FREAK Inc., Tokyo (JP); Creatures, Inc., Tokyo (JP)

( * ) Notice: Subject to any disclaimer, the term of this patent is extended or adjusted under 35 U.S.C. 154(b) by 0 days.

(21) Appl. No.: 09/583,861

(22) Filed: Jun. 1, 2000

(30) Foreign Application Priority Data

Aug. 26, 1999 (JP) .......................................... 11-283279
Nov. 19, 1999 (JP) .......................................... 11-330725

(51) Int. Cl.[7] ................................................. A63F 9/24
(52) U.S. Cl. .......................................... 463/31; 463/43
(58) Field of Search ............................. 463/1, 30, 31, 463/43, 44, 45, 36, 42; 273/459–461

(56) References Cited

U.S. PATENT DOCUMENTS

| | | | |
|---|---|---|---|
| 4,180,805 A | 12/1979 | Burson | |
| 5,065,414 A | 11/1991 | Endou et al. | |

(List continued on next page.)

FOREIGN PATENT DOCUMENTS

| | | |
|---|---|---|
| JP | 1-107187 | 4/1989 |
| JP | 6-218088 | 8/1994 |
| JP | 7-181056 | 7/1995 |
| JP | 8-84894 | 4/1996 |
| JP | 8-103568 | 4/1996 |
| JP | 8-224349 | 9/1996 |
| JP | 9-146566 | 6/1997 |
| JP | 9-155064 | 6/1997 |
| JP | 10-277262 | 10/1998 |
| JP | 11-99276 | 4/1999 |
| JP | 11-109844 | 4/1999 |
| JP | 11-179055 | 7/1999 |
| JP | 11-299988 | 11/1999 |
| JP | 11-309273 | 11/1999 |
| WO | WO 98/14898 | 4/1998 |

OTHER PUBLICATIONS

Pokémon Pikachu packaging, Model No.: MPG–001, Nintendo of America Inc., 1998, 4 pages.
Tamagotchi Virtual Pet instructions, 6 pages, Bandai, 1996–1997.
"Drawings on Napkins, Video Game Animation, and Other Ways to Program Computers", Ken Khan, Information Access Company and Association for Computing Machinery, vol. 39, No. 8, p. 49, Aug. 1996, (2 pages).
May, Scott, "We Need to Distinguish Ourselves From Edutainment", IDG Commucications, inc., InfoWorld, Aug. 13, 1984, 2 pages.
"C User's Journal", Apr. 1992, 1 page.
PC Magazine, Oct. 2, 1984, 2 pages.
Gavin, Maurice, "The Hally Orrery: A program to show the comet's orbit", pp 64–66, *New Scientist, Spotters–Guide, Halley's Comet*, London England, 1985.

(List continued on next page.)

Primary Examiner—Mark Sager
(74) Attorney, Agent, or Firm—Nixon & Vanderhye P.C.

(57) ABSTRACT

An image-display game system with an idea of monsters' virus infection comprises an information storage medium 10A in which a game program is stored, an actuator 22, a processor 23 for information processing responding to the actuator 22 and based on the program, an image display 27, and a temporal writable/readable storage 12, 25 including an infection data region 12c where data indicating whether or not the character has been virus infected is stored. When a predetermined condition is satisfied, data is written into at least one infection data region corresponding to the captured characters stored in the temporal storage means.

17 Claims, 18 Drawing Sheets

U.S. PATENT DOCUMENTS

| | | | |
|---|---|---|---|
| 5,265,888 | A | 11/1993 | Yamamoto et al. |
| 5,267,734 | A | 12/1993 | Stamper et al. |
| RE34,728 | E | 9/1994 | Hall-Tipping |
| 5,370,399 | A | 12/1994 | Liverance |
| 5,390,937 | A | 2/1995 | Sakaguchi et al. |
| 5,498,002 | A | 3/1996 | Gechter |
| 5,645,513 | A | 7/1997 | Haydocy et al. |
| 5,649,862 | A | 7/1997 | Sakaguchi et al. |
| 5,746,656 | A | 5/1998 | Bezick et al. |
| 5,807,174 | A | 9/1998 | Fukuhara et al. |
| 5,810,665 | A | 9/1998 | Takemoto et al. |
| 5,833,536 | A | 11/1998 | Davids et al. |
| 5,833,540 | A | 11/1998 | Miodunski et al. |
| 5,855,512 | A | 1/1999 | Aoyama et al. |
| 5,885,156 | A | 3/1999 | Toyohara et al. |
| 5,935,003 | A | 8/1999 | Stephens et al. |
| 5,947,868 | A | 9/1999 | Dugan |
| 5,956,685 | A | 9/1999 | Tenpaku et al. |
| 5,999,622 | A | 12/1999 | Yasukawa et al. |
| 6,022,274 | A | 2/2000 | Takeda et al. |
| 6,039,648 | A | 3/2000 | Guinn et al. |
| RE36,675 | E | 4/2000 | Yamamoto et al. |
| 6,115,036 | A | 9/2000 | Yamato et al. |
| 6,117,009 | A | 9/2000 | Yoseloff |

OTHER PUBLICATIONS

Press Release, "Activision Little Computer People' People Project: Research Update", Activision, Mountain View, California, Jul. 12, 1985, 2 pages.

Emery, Jr., C. Eugene, "Who's the little guy in there?" *Knickerbocker News*, p. 22 Albany, New York, Dec. 16, 1985.

Advertisement, "We're learning to love the little people who live inside computers", USA Today, Nov. 11, 1985, 1 page.

Mulloy, Mike, "David, dog, and others live inside computers", Maywood Herald, Oak Park, Illinois, Jan. 29, 1986, 1 page.

Katz, Arnie, "The Little Computer People Project", pp. 47–49, Ahoy!, 03/86.

Research Update: Activism, "Little Computer People" Project, p. 9, Computer Entertainer, 8/85.

Bishop, David, "Little Computer People", Computer and Video Games, 1985, 6 pages.

Bartimo, Jim, "Q&A: David Crane", p84, Info World, Mar. 12, 1984.

Advertisement, "Who's living in your computer? It's me!", p. 62, Commodore Computing, 12/85.

Kristiansen, Rasmus Kirkegard, "The Little Computer People—Hvor Kommer De Fra?", pp. 4–7, SOFT, Jan.–Feb. 1986 (with translation).

Advertisement, "Unitsoft Distribution", Computer and Video Games, 5/86, 1 page.

Mason Ralph, Little Computer People: Research Project, Win 64 Emulator (copyright), 1995, 3 pages.

Crane, David and Nelson, Sam, "Little Computer People", 1986, Activision, 7 pages.

Activision's Modern Computer People: human–like beings actually found living inside computers, (Activision, Mountain View, CA), pp. 1–12, 1985.

Advertisement, Little Computer People Discovery Kit, (Activision, Software, Mountain View, CA), 1985, 1986, 2 pages.

A Computer Owner's Guide to Care of and Communication with Little Computer People, (Activision, Mountain View, CA), 1985, 8 pages.

Activision Catalog, (Activision, Mountain View, CA), 1985, 4 pages.

InfoWorld, 1986, 1 page.

Ryan, Bob, Dr.Floyd's Desktop Toys (MicoProse Entertainmenmt Pack vol. 1), McGraw Hill, Apr. 1993, 2 pages.

"Turn Up the Heat This Holiday Season With Nine Sizzling Games From Activision", PR Neswire Association, Dec. 7, 1995, 3 pages.

Jones, George, "MechWarriors mass for Network attack; new Net–Mech action game from Activision", Nov. 1995, 3 pages.

Tamagotchi Instructions, Bandai, 1996–1997, 8 pages.

Kantrowitz, Barbara and Namuth, Tessa, "A New Pet Rock for the Digital Generation", Newsweek, Jun. 9, 1997, p. 62.

Lawson, Carol, "Love it, feed it, mourn it", New York Times, May 22, 1997, 1 page.

Asahi National Broadcasting, "Tamapitchi Takes Off", Jun. 15, 1997, 2 pages, http://www.tv–asahi.co.jp/broadcast/click/article_08.htm.

Scheyen, Peter, "Border Zone", Overview, Feb. 6, 1996, 2 pages, http://www.csd.uwo.ca/Infocom/borderzone.html.

Waijers, Boudewijn, "The Roguelike Games Home Page", May 13, 1996, 10 pages, http://www.win.tue.nl/~kroisos/roguelike.html.

Waijers, Boudewijn, "The Roguelike Home Page", Feb. 28, 1996, 1 pages, http://www.win.tue.nl/games/roguelike/rogue/index.html.

Doherty, Paul David, "Infocom Fact Sheet", Sep. 3, 1995, 8 pages, ftp://ftp.hmd.de/if–archive/infocom/infocom/info/info/fact–sheet.txt.

Master–Type– Rock's Boots, 2 pages http://www.globaldialog.com/~pliethen/apple2/isaac/edu/2.edu/2.html, date unknown, on Internet prior to May 1997.

Border Zone: A Game of Intrigue, date unknown.

"Time and Date in NetHack", Boudewijn Wayers, ftp://ftp.win.tue.nl/pub/games/nethack/General/Spoilers/NH31/timedate, date unknown.

The NetHack Home Page, Boudewijn Wayers, Jul. 12, 1996, http://www.win.tue.nl/~kroisos/nethack/.

Fig. 4    RAM25 (12)

| Captured Pokemon Data Region 12A |||||||||||||
|---|---|---|---|---|---|---|---|---|---|---|---|
| 1 | Poke-mon No. | H P | Exp. p | Level | State | Tech. | P. ID | Ability Attack Defense Special Attack Special Defense Speed | Mis-cella-neous | Sex | Item on-hand | Virus | Mis-cella-neous |
| 2 | Poke-mon No. | H P | Exp. p | Level | State | Tech. | P. ID | Ability Attack Defense Special Attack Special Defense Speed | Mis-cella-neous | Sex | Item on-hand | Virus | Mis-cella-neous |

120  121  122  123  124  125  126  127  128  12a  12b  12c  12d

| N | Poke-mon No. | H P | Exp. p | Level | State | Tech. | P. ID | Ability Attack Defense Special Attack Special Defense Speed | Mis-cella-neous | Sex | Item on-hand | Virus | Mis-cella-neous |
|---|---|---|---|---|---|---|---|---|---|---|---|---|

⎧ Conventional ⎫  ⎧ New Type ⎫

| On-Hand Pokemon Storage Region 12B | Battle Data Storage Region 12C || Table Region 12D |
|---|---|---|---|
| Pokemon 1, Pokemon 2, Pokemon 3, Pokemon 4, Pokemon 5, Pokemon 6 | Opponent Character Data (Name, etc.) | Opponent Pokemon Data (HP, Level, etc.) | Item Table |

| Miscellaneous Storage Region 12E ||||
|---|---|---|---|
| Location Data Playing Time Data Name Data and the like | Personal ID (Player) Rival's ID (Rival 1) Rival's ID (Rival 2) Rival's ID (Rival 3) Rival's ID (Rival 4) Rival's ID (Rival 5) | Item on-hand | Other New Data |

| Probability | Random Number (0 ~ 7) | C (R6×2+D) | Item |
|---|---|---|---|
| Most Common | R6 | 0<br>1<br>2<br>3<br>·<br>·<br>·<br>15 | Item a 0<br>Item a 1<br>Item a 2<br>Item a 3<br>·<br>·<br>·<br>Item a 15 |
| Popular | R6 | 0<br>1<br>2<br>3<br>·<br>·<br>·<br>15 | Item a 16<br>Item a 17<br>Item a 18<br>Item a 19<br>·<br>·<br>·<br>Item a 31 |
| Least Common | R6 | 0<br>1<br>2<br>3<br>·<br>·<br>·<br>15 | Item a 32<br>Item a 33<br>Item a 34<br>Item a 35<br>·<br>·<br>·<br>Item a 47 |
| Rare | R6 | 0<br>1<br>2<br>3<br>·<br>·<br>·<br>15 | Item a 48<br>Item a 49<br>Item a 50<br>Item a 51<br>·<br>·<br>·<br>Item a 63 |

Fig. 15(b)

| Item |
|---|
| Berry |
| Przcureberry |
| Mint Berry |
| Ice Berry |
| Burnt Berry |
| Psncureberry |
| Bitter Berry |
| Guard Spec. |
| X Defend |
| X Attack |
| Dire Hit |
| X Special |
| X Accuracy |
| Eon Mail |
| Morph Mail |
| Music Mail |

|  |  |  |  | Item b 1 |
|---|---|---|---|---|
| b1 ≦ | W | < b1 |  | Item b 2 |
| b2 ≦ | W | < b2 |  | Item b 3 |
| b3 ≦ | W | < b3 |  | Item b 4 |
| b4 ≦ | W | < b4 |  | Item b 5 |
|  | W |  |  |  |

IMAGE-DISPLAY GAME SYSTEM

BACKGROUND OF THE INVENTION

1. Field of the Invention

The present invention relates to image-display game systems and, more specifically, to an image-display game system diversified in game process with property data provided to characters such as monsters appearing therein. Such an image-display game system is applied to video game machines and portable game machines on which those characters have battles, get captured, get trained, are traded, or any combination thereof.

2. Description of the Background Art

Video games such as the "Pocket Monster (versions in red, green, blue, and yellow)" (trade name; hereinafter, "prior art") have been designed and distributed by the same assignee of this application. In the prior art, the game is played for capturing, training, and trading characters (hereinafter referred to as monsters or characters), and each version differs in probability of a character or monster appearing. The characters such as monsters are tradable among players, and each player captures and keeps up to the maximum number of characters or monsters.

The player can enjoy the game in the prior art for a relatively long period without losing his or her interest. Furthermore, exchanging the characters such as monsters with friends serves to expand communications and cultivate friendships. However, the players may lose their interest sooner or later if the game is fun for trading the characters such as monsters only.

Therefore, a main object of the present invention is to provide an image-display game system, incorporating virus infection and being full of change and surprise, and encouraging players to trade monsters. Herein, game characters such as monsters are, for example, pocket monsters (hereinafter, shortened as "pokemons").

SUMMARY OF THE INVENTION

This invention is directed to an image-display game system comprising an information storage medium and an image-display game device detachable with the information storage medium, the information storage medium comprising a program storage in which a game program is unalterably stored, and the image-display game device comprising: an actuator by a player; a temporal writable/readable storage including an infection data region where property data varied in type is stored for every character captured in the course of a game, and data indicating whether the character has been virus infected is started; a processor for carrying out information processing in response to the actuator and based on the program; and an image display for displaying an image obtained through processing carried out by the processor, wherein, with the program carried out, the processor subjects an image on display to change in response to the actuator; changes the property data to be stored in the temporary storage responding to game process made based on the state of the actuator; changes the characters' images based on the property data; has data indicating if the captured character has been virus infected; and writes the data indicative of being virus infected into at least one of the infection data regions corresponding to the captured characters stored in the temporal storage, when a predetermined condition is satisfied.

According to a preferred embodiment of the present invention, which incorporates virus infection, it is possible to provide an image-display game system and an information storage medium having a game program stored therein, which provides for a game full of changes and surprises and encourages the players to trade characters such as monsters.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a memory map for RAM 12 (RAM 25) shown in FIG. 2;

FIG. 15 is a diagram in assistance of explaining an item selection method shown in FIG. 14;

DESCRIPTION OF THE PREFERRED EMBODIMENT

Figure 1:
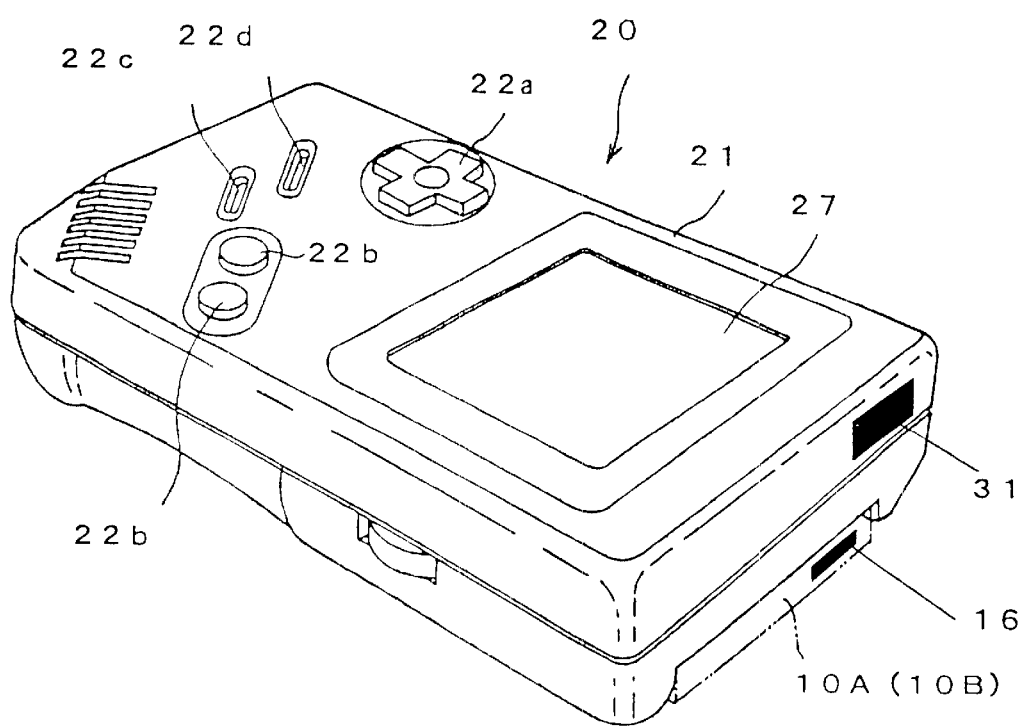
FIG. 1 is an external view of a portable game machine to which an image-display game system according to an embodiment of the present invention is applied.
Figure 2:
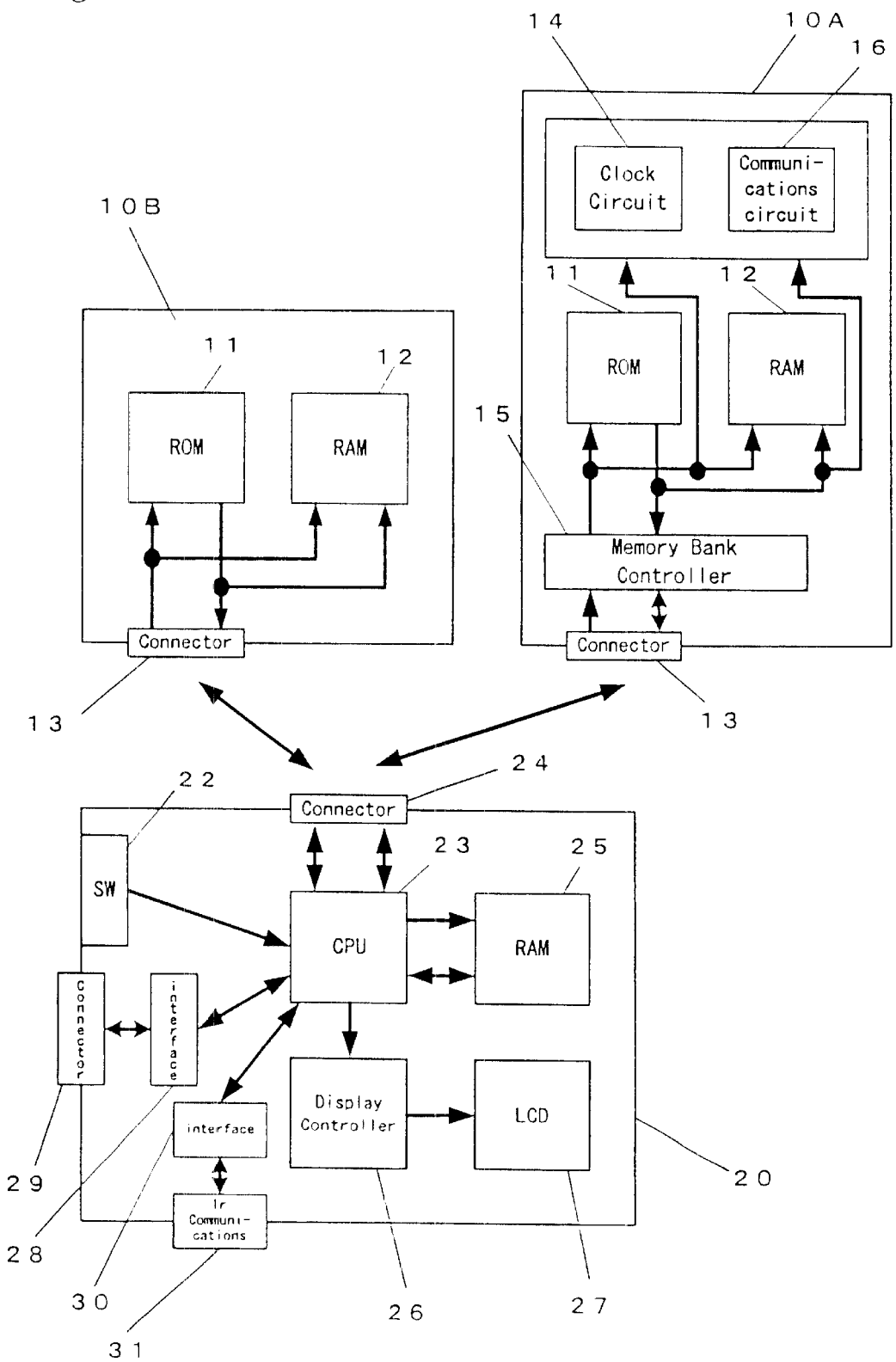
FIG. 2 is a block diagram showing the structure of the image-display game system shown in FIG. 1.

In FIG. 1, an external view of a portable game machine to which an image-display game system according to an embodiment of the present invention applied is shown. In FIG. 2, the structure of the portable game machine in FIG. 1 is shown. As shown in FIG. 1, the image-display game system according to the present embodiment is structured by a game cartridge 10A, which is an example of an information storage medium, and a portable game machine 20, which is an example of image-display game machine engageable with the game cartridge 10A in a detachable manner. There are at least two portable game machines 20, each attached with the game cartridge 10A or a conventional game cartridge 10B are prepared.

The game cartridge (or ROM cartridge; hereinafter, referred simply to as "cartridge") 10A includes, as shown in FIG. 2, program storage means exemplarily implemented by nonvolatile memory (hereinafter, "ROM") 11; temporal storage means by readable/writable memory (hereinafter, "RAM") 12; a connector 13; a clock circuit (timer) 14; a memory bank switch control circuit 15; and communications means (circuit) exemplarily implemented by infrared transmitter/receiver 16, and all of which are mounted on a substrate (not shown). The substrate is housed in a case or a housing (not shown). These ROM 11, RAM 12, clock circuit 14, memory bank switch control circuit 15, and infrared transmitter/receiver 16 are respectively coupled to terminals of the connector 13 through data bus and address bus, and then are coupled to a connector 24 of the portable game machine 20. As is known from a left in FIG. 2, the conventional cartridge 10B includes the ROM 11, RAM 12, and connector 13.

Figure 3:
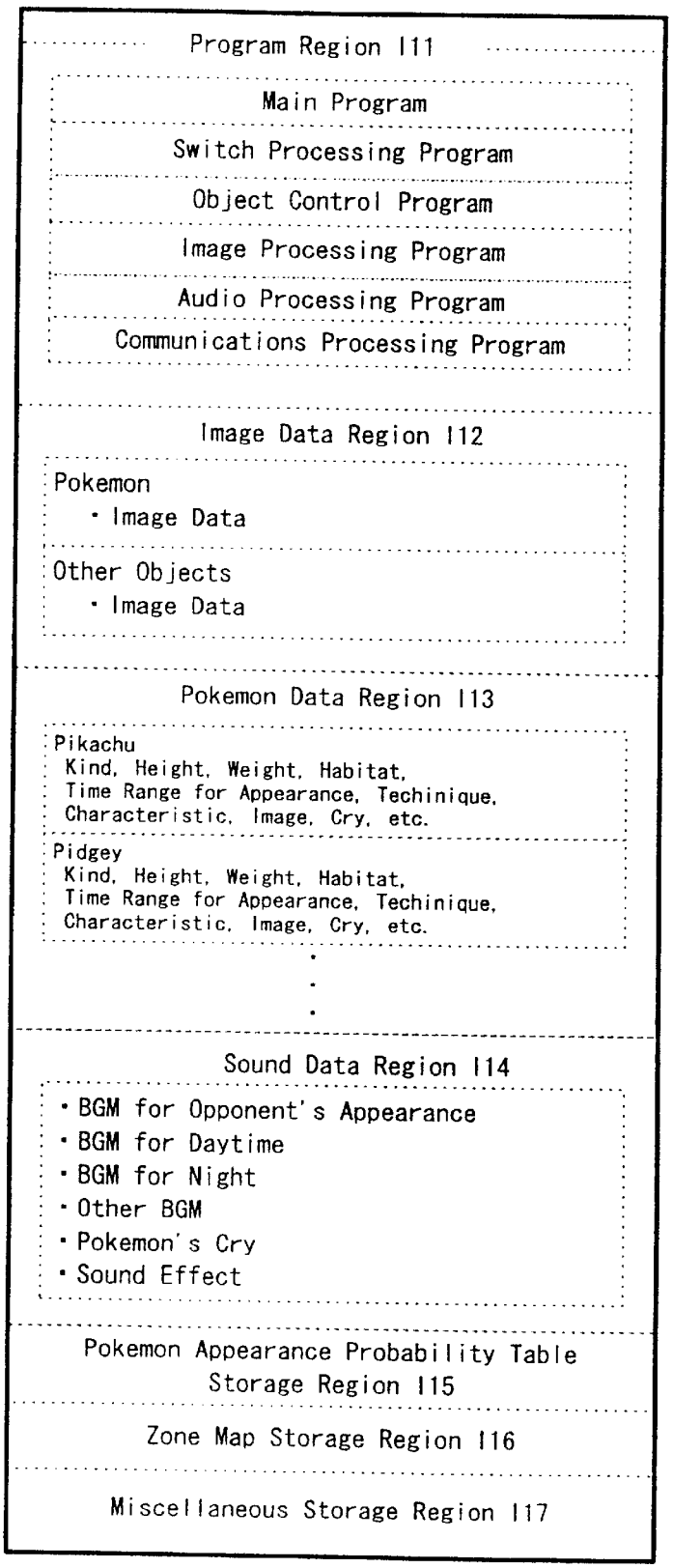
FIG. 3 is a memory map for ROM 11 shown in FIG. 2.

The nonvolatile memory 11 unalterably stores a game program and is exemplarily implemented by ROM, flash memory, or EE-PROM. The ROM 11 includes, as shown in FIG. 3, storage regions of I11 to I17 each for storing various program data, image data, or setting data.

More specifically, a program region I11 stores programs relevant to game details such as main program, switch processing program, object (or character) control program, image processing program, audio processing program, and the like. If the game is for capturing and training pokemons, exemplary programs relevant to the game details including a capturing program and a training program are stored. In addition thereto, a program for storing DOT (image) data for the respective pokemons and exchanging data among other game machines 20' (not shown) and a program for ensuring compatibility with the conventional cartridges 10B are stored.

An image data region I12 stores, separately, image data for every pokemon to appear in the game and image data for other objects (characters) such as a human being, background, or items to be displayed. A pokemon data region I13 stores property data for distinguishing every pokemon by name, kind, height (stature), weight, habitat, time range for appearance, possible technique, characteristic, cry, and the like.

A sound data region I14 stores data for sound effects and BGM for the game. In detail, BGM data depending on the game scene such as an opponent's appearing, or in the daytime or at night, and digital data for pokemons' cry and sound effects are stored.

A pokemon appearance probability table storage region I15 stores, for every pokemon, both habitat and appearance probability data. The appearance probability data is stored such that the appearance probability varies between daytime and night, as required.

A zone map storage region I16 stores a zone range where a main character activated by the player can move, and data for a map of the zone.

A miscellaneous storage region I17 stores miscellaneous data such as a processing program for determining, for example on the basis of ID data, an item to present as a gift (or give) to a player who is a partner of data exchange or communications.

Hereinafter, when there is no need to discriminate the cartridge between new-type or conventional, the cartridge is collectively denoted by a reference numeral 10.

The RAM 12 has a region for storing property data varied in type respectively for the characters captured in the course of the game. Such storage region on the RAM 12 includes, as shown in FIG. 4, a captured pokemon data region 12A for storing any captured (or obtained) pokemon, an on-hand pokemon storage region 12B, a battle data storage region 12C, a table region 12D, and a miscellaneous storage region 12E.

The captured pokemon data region 12A includes areas 120 to 128 and 12a to 12d for every pokemon character which is fictionally-created monster.

The area 120 is an area which stores pokemon codes (or pokemon numbers).

The area 121 stores a hit point (HP), for each pokemon code, which indicates the pokemon's power.

The area 122 stores the pokemon's experience point.

The area 123 stores the pokemon's level.

The area 124 stores the pokemon's status.

The area 125 stores data relevant to the pokemon's possible attack (technique).

The area 126 stores parental ID data indicating who captured the pokemon (the player's name or ID data).

The area 127 stores ability value of attack, defense, special attack, special defense, speed, and the like.

The area 128 is an area left vacant for storing data not defined yet.

The area 12a stores the pokemon's sex.

The area 12b stores items on hand, for example, weapons available for the pokemon to fight against opponents.

The area 12c stores data (virus data) indicating whether the pokemon has been infected by any virus, data indicating the virus type if infected, or both.

The area 12d is an area left vacant for storing miscellaneous data.

Herein, the areas 120 to 128 are storage areas provided to both of the new-type cartridge 10A and the conventional cartridge 10B, and any data stored therein is compatible. The areas 12a to 12d are unique only to the new-type cartridge 10A.

The on-hand pokemon data storage region 12B stores six pokemon codes or pokemon numbers assigned to those selected by the player among from those stored in the captured pokemon data region 12A. These six pokemons can travel with the main character.

The battle data storage region 12C stores another player's (trainer's) name who is having a battle with the first player through a communications cable 40, and various data relevant to his or her pokemons joined in the battle (e.g., pokemon number, HP, level). The battle data storage region 12C includes an area for storing battle character data (pokemons' names), and an area for storing data, for every pokemon joined the battle, corresponding to the areas 120 to 12*d*.

The table region 12D stores table data for determining an item to be presented in response to ID code communicated or exchanged by using the infrared transmitter/receiver 16, and data for determining an item to be presented, based on the number of steps, in response to step-number data provided through communications with a pedometer-incorporated game machine 50.

The miscellaneous storage region 12E includes areas 12*f*, 12*g*, 12*h*, and 12*i*. The area 12*f* is an area which stores the player's name data as a part of the ID data. After the time of purchase, the player actuates operation switches 22*a* and 22*b* to store his or her name or nickname therein.

The area 12*g* includes an area for storing the player's own ID data and an area for storing other ID data for a predetermined number of players (5 players). To the area for storing the player's own ID data in the area 12*g*, ID data determined based on the player's name or nickname stored at the purchase of the cartridge 10A and random numbers is written automatically. To the area for storing other players' ID data in the area 12*g*, their ID data (ID codes) transmitted from their portable game machines 20 is successively written for a predetermined number of players. With respect to each ID data stored in the area, time data (e.g., time, date) indicating when data communications was made is also written.

By additionally storing time data for each ID data, the area 12*g* receives ID data limited to one-person-one-ID-data basis, thereby preventing any identical ID data from being received many times in a single day. Furthermore, by setting the upper limit for the ID data to be stored, for example, to 5, the area 12*g* stops storing ID data once reached the upper limit regardless of the number of players communicating with (or exchanging date with) for the day. In this manner, the player is thus encouraged to have communications with various players for each different day, rather than sticking to only one player. As such, the game can help players to make friends and further, to improve communications therebetween.

To the area 12*h*, item data such as data relevant to helping items is written. The helping items are presented based on random numbers generated in accordance with other players' ID data obtained through communications or numbers obtained by computing such ID data with a predetermined equation. These helping items are beneficial in the course of the game, and include medicine for accelerating pokemons' growth or evolution, protective gear against opponents' attack, medicine for restoring pokemons' lives, and the like.

Such helping items (helping data) provided based on the ID data are preferably not obtained only by playing the game. Accordingly, the player is encouraged to communicate with other players to exchange ID data, and thus data communications among players becomes active.

The area 12*i* stores data for another player's pokemons which are having the battle with the first player, for example a total of six, and the other player's name. After once written into the area 12*i* through data communications, such pokemon data becomes available for the user's strategical study of the battle throughout the simulated battle.

The clock circuit 14 includes a timer at least counting time, and if required, indicating date (month/day) and day of the week. When a memory chunk of the ROM 11 is too large for an address bus to address, the memory bank switch control circuit 15 divides the memory chunk into a plurality of memory banks, and generates bank data for the higher address in the ROM 11 and for addressing a memory chunk on the RAM 12. It is herein preferable to integrate the clock circuit 14 and the memory bank switch control circuit 15 on one-chip integrated circuit (IC) so as to reduce the number of chips and cost.

As shown in FIG. 1, the portable game machine 20 includes the operation switches 22 arranged on the lower part of the surface (plane) of a housing 21, and a liquid crystal display 27 placed on the upper part thereof. In the housing 21, the circuit board having the constituents as shown in FIG. 2 mounted thereon is accommodated. The operation switches 22 include a direction switch 22*a* used to move a cursor and direct any character available for the player in desired directions, an action switch 22*b* used for action command, a start switch 22*c*, and a selection switch 22*d*.

To be more specific, the portable game machine 20 is equipped with a central processing unit (CPU) 23. The connector 24 is connected to the CPU 23 for connection with the cartridge 10. A working RAM 25 for temporarily storing data for game processing and a display control circuit 26 are also connected thereto. When a mode (continue mode) of continuing the previously-played game is selected at the start of the game, the RAM 25 is supplied with backup data stored on the RAM 12 in the cartridge 10A. Therefore, the RAM 25 is allocated with the same storage regions or areas as the RAM 12. In the following description, the storage region or area for the RAM 25 is under the same name and reference numeral provided to that of the RAM 12.

To the display control circuit 26, the liquid crystal display (LCD) 27 is connected to the CPU 23. A connector 29 is connected via an interface 28 to the CPU 23. The connector 29 is connected to a connector 29' provided to other portable game machine 20' via a cable which is a communications means for pokemon trading with the owner (player) of the portable game machine 20'. The infrared transmitter/receiver 16 in the cartridge 10A is a possible as an alternative to such a cable. Or instead of the infrared transmitter/receiver 16, an infrared transmitter/receiver 31 may be integrally attached to the housing of the portable game machine 20.

Figure 5:
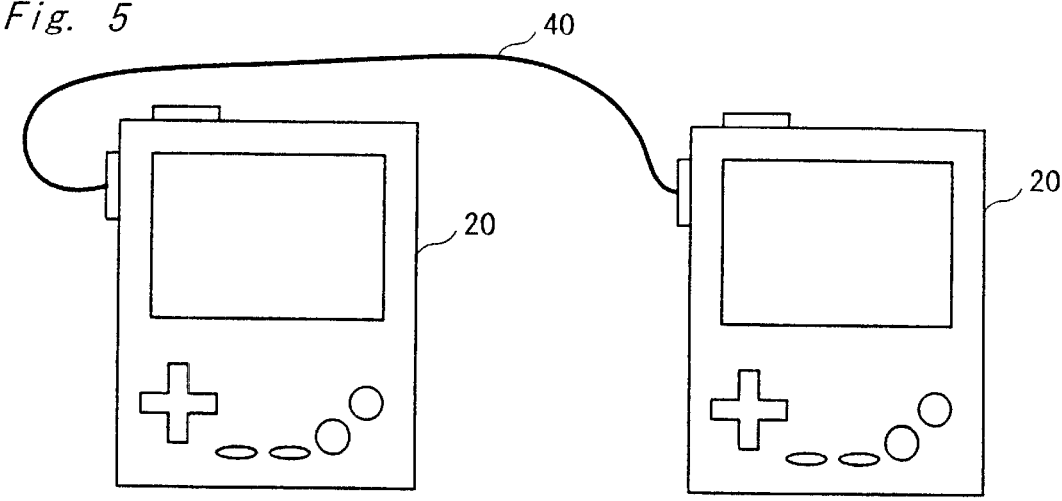
FIG. 5 is a diagram assisting explanation of the system construction for executing data communications between two portable game machines which are connected by a cable.
Figure 6:
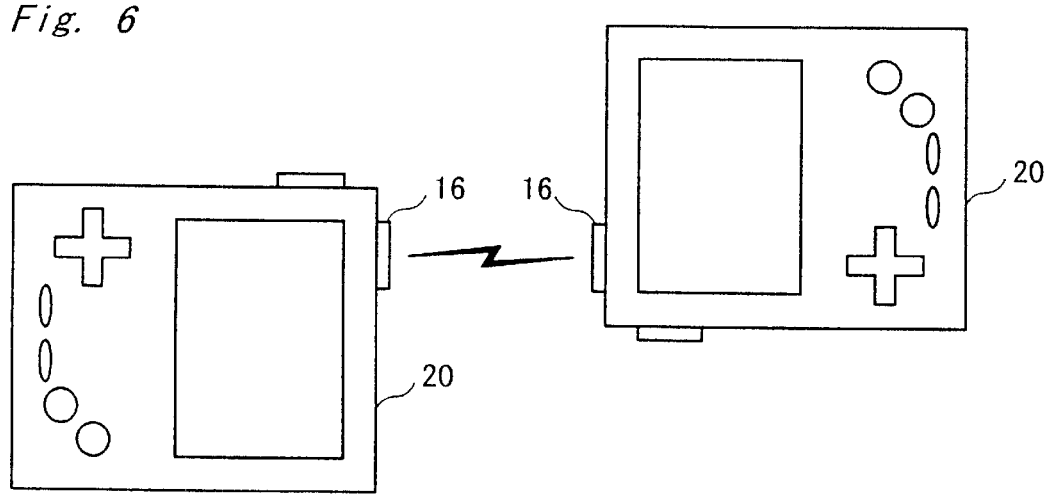
FIG. 6 is a diagram assisting explanation of the system construction for executing data communications between two game machines utilizing an infrared transmitter/receiver.

FIGS. 5 and 6 exemplarily show how two game machines according to an embodiment of the present invention are connected for data communications or data exchange. In FIG. 5, two portable game machines 20 are exemplarily connected to each other via the cable 40 for data communications.

In FIG. 6, two game machines 20 perform data communications therebetween with the infrared transmitter/receivers 16. These two game machines 20 are wirelessly connected by means of the infrared transmitter/receivers 16. In such case, even if the conventional game machine 20 is not equipped with any cable connector or the infrared transmitter/receiver 16, there only needs to an infrared transmitter/receiver 16 on the cartridge 10A to perform data communications. Alternatively, the infrared transmitter/receiver 16 may be integrally provided somewhere in the housing of the game machine 20.

Figure 7:
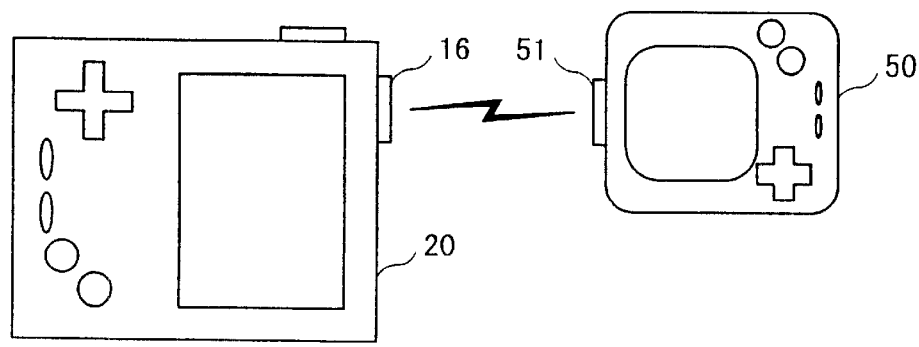
FIG. 7 is a diagram assisting explanation of the system construction for executing data communications between one game machine and a pedometer incorporated game machine utilizing an infrared transmitter/receiver.

FIG. 7 shows a case where the infrared transmitter/receiver 16 in the game machine 20 and an infrared transmitter/receiver 51 in the pedometer-incorporated game machine 50 perform data communications therebetween.

Figure 8:
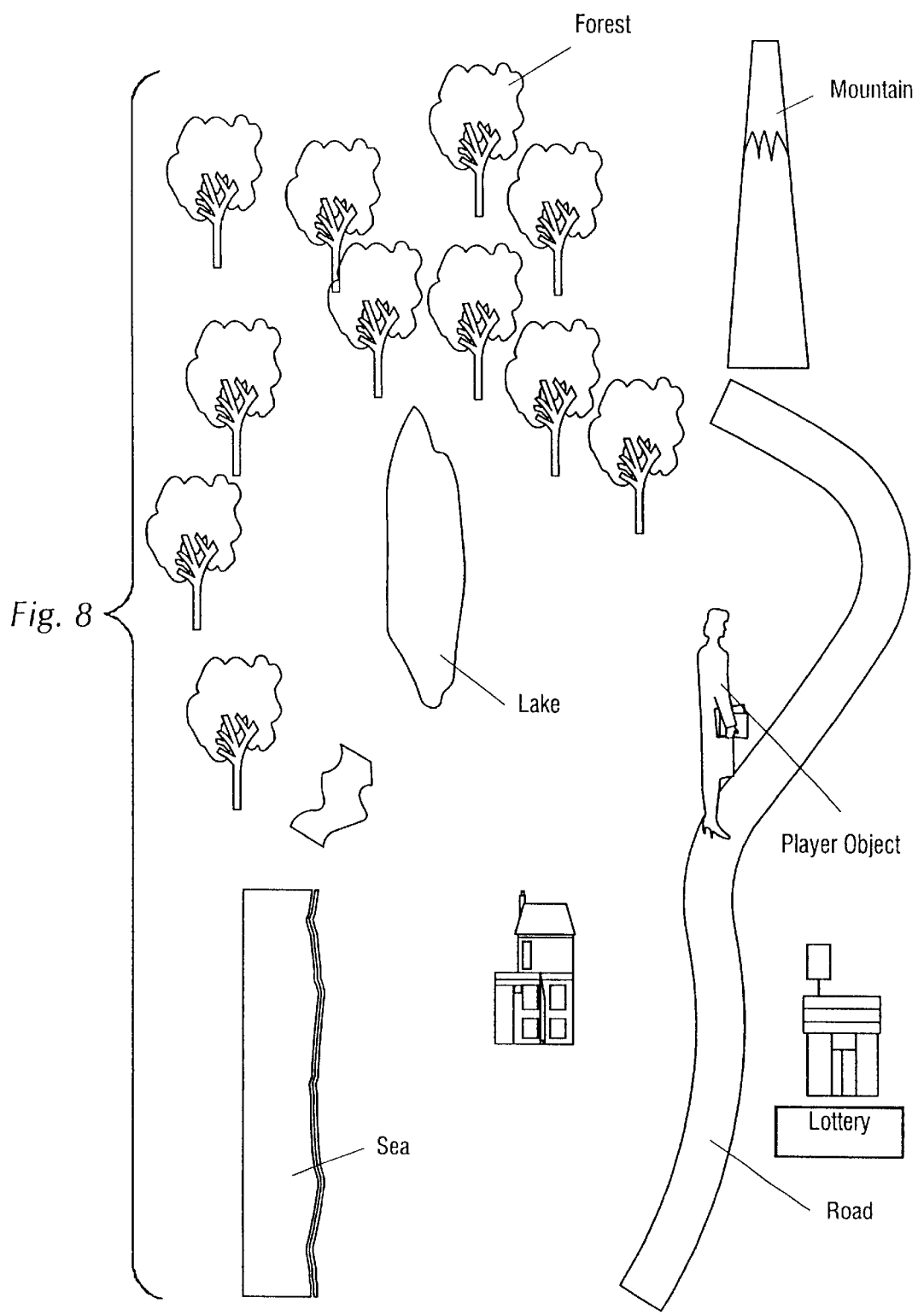
FIG. 8 is a game map assisting explanation of details of a game carried out by the image-display game system shown in FIG. 1.

Next, with reference to an exemplary game map in FIG. 8, how the game proceeds on the image-display game system of this embodiment is described. For an exemplary game for capturing (collecting) and training the fictionally-created pokemons, and letting such pokemons have battles with other players' pokemons, a main character assumed to be the player himself/herself sets off to capture and collect pokemons. In such a game, the main character travels into pond, woods, or grassy area where pokemons live, and runs into one of them. There, against the encountered pokemon, the player allows his or her own captured or trained pokemon to fight. If the player's pokemon beats the other pokemon, the player captures the defeated pokemon and adds it to his collection. By repeating this, the player can capture pokemons up to the limit (maximum) set in the program, and complete his or her pokemon collection. The main character can bring along a predetermined number of pokemons (e.g., 6), and such pokemons are called on-hand pokemons.

In detail, the player depresses the start switch 22c to start the game. After the title screen, the player sees an initial screen for the game (a part of FIG. 8) showing a part of a map for a certain stage shown in FIG. 8. The player moves a player character (or player object) on the map by actuating the direction switch 22a to let it travel into any possible area where the pokemons live, and capture them. The pokemons' habitats vary according to the pokemons' kind: for example, in pond or sea for water pokemons, and in grassy area, field, woods for grass pokemons.

The pokemons have unique characteristics, and some come out only at specific areas and times. For such a setting, when the clock circuit 14 indicates the program-set time or time range, appropriateness of such pokemon's appearance, appearance probability, or both is conditionally changed.

By taking nocturnal pokemons (e.g., owl pokemon or bat pokemon) as an example, the appearance probability starts to increase at nightfall or stays at a certain level for a duration and increases at midnight. The probability then starts to decrease as dawn approaches, and reaches a minimum in the daytime (e.g., appearance probability 0).

For diurnal pokemons, conversely, the appearance probability reaches a maximum in the daytime, and 0 at midnight. For pokemons changing their hiding areas depending on time range or time, program setting is made accordingly. Specifically, for pokemons living in water in the daytime but on the land at nighttime, program setting is made such that those pokemons change or relocate their habitat depending on time range.

Once the player captures a pokemon, its pokemon number is written into the vacant area in the captured pokemon data region 12A. Simultaneously, the pokemon's current hit point (HP), experience point, level, state, technique, ability, and the like, are written into the areas 120 to 128, respectively. If the player's cartridge is a type including pokemon's property data of sex, item, and virus, for example, such data is written respectively into the areas 12a, 12b, and 12c.

Note herein that, the virus-infected pokemon is rare, and thus its rate of increase for HP, experience point, level, or ability value obtained through the training is set higher than the non-virus-infected pokemons'. Accordingly, the player wants to find the virus-infected pokemon to accelerate his or her own pokemons' growth or training. If found, the player takes in the newly-captured virus-infected pokemon as his or her on-hand pokemons (or puts all in a training box), and virus-infects his or her own not-yet-infected pokemons to let them grow quicker. As such, with the help of a trick for accelerating pokemons' growth or level-up such as virus infection, the player can advantageously shorten training time required for the pokemons to reach a certain level.

When the game is played with the game cartridge 10A including pokemons' sex data, the player can select a male and a female from among the captured pokemons of a kind (those having the same pokemon code) and put those in the training box. The time or day is temporarily stored in a register. When the clock circuit 14 indicates that a program-determined number of days has passed, the pokemon couple brings a baby into life having their property data (e.g., ability, power) inherited. The baby is counted as one of the player's own pokemons and is tradable with other players.

Accordingly, the pokemons can be easily collected and the game proceeds quicker. The player can enjoy, with full expectations, training the baby pokemon from its childhood. When the player has several pokemons of a kind, he or she can trade any of those with another players' pokemons of a different kind.

For pokemon trading between owners of new-type cartridge 10A and conventional cartridge 10B, it is preferable to ensure compatibility to the extent possible as to data for pokemons' sex, item, virus infection, and the like, to be stored in the area 12a to 12c. For such purpose, at the time of data transfer from the new-type cartridge 10A to the conventional cartridge 10B, the vacant area 128 stores, with one bit, whether the areas 12a to 12c have any data therein.

If the game is played with the conventional cartridge 10B, the game proceeds without such additional data as pokemons' sex, item, and virus-infection. After data transfer is made from the conventional cartridge 10B to the new-type cartridge 10A, the owner of the new-type cartridge 10A can use such additional data for the game.

When data transfer is made from the conventional cartridge 10B to the new-type cartridge 10A, conversely, the sex data not available in the conventional cartridge 10B is determined in accordance with a predetermined rule, and is written into the area 12a of the new-type cartridge 10A. Such predetermined rule may function such that a number in the last digit of the time indicated by the clock circuit 14 determines the sex, for example, male for odd numbers and female for even numbers, or through use of random numbers.

In this manner, the conventional cartridge 10B and the new-type cartridge 10A can be compatible to the extent possible with each other for pokemon trading, and such compatibility allows a large number of players to exchange data. Furthermore, if the owner of the conventional cartridge 10B additionally purchases the new-type cartridge 10A, he or she can transfer every single pokemon trained in the conventional cartridge 10B to the new-type cartridge 10A, and those transferred pokemons are put to effective use.

As such, pokemons captured, generated from pokemon couples, and traded with other players are used for battles with other players'.

Figure 19:
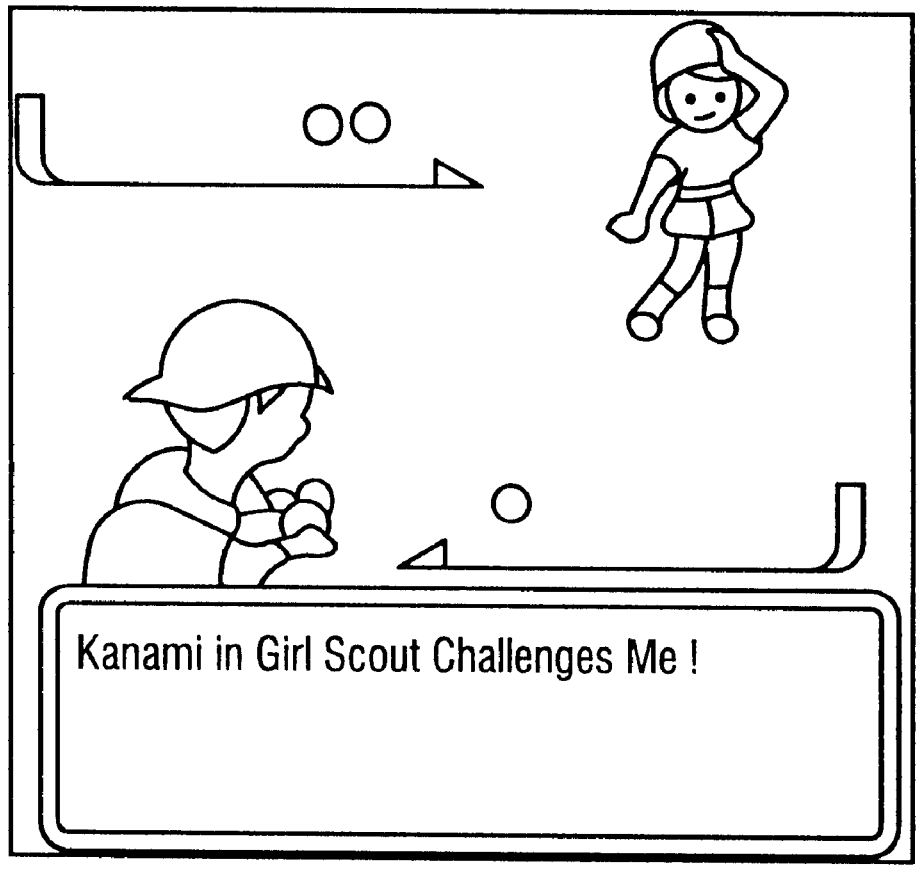
FIG. 19 is a diagram showing an example of battle game screen.
Figure 20:
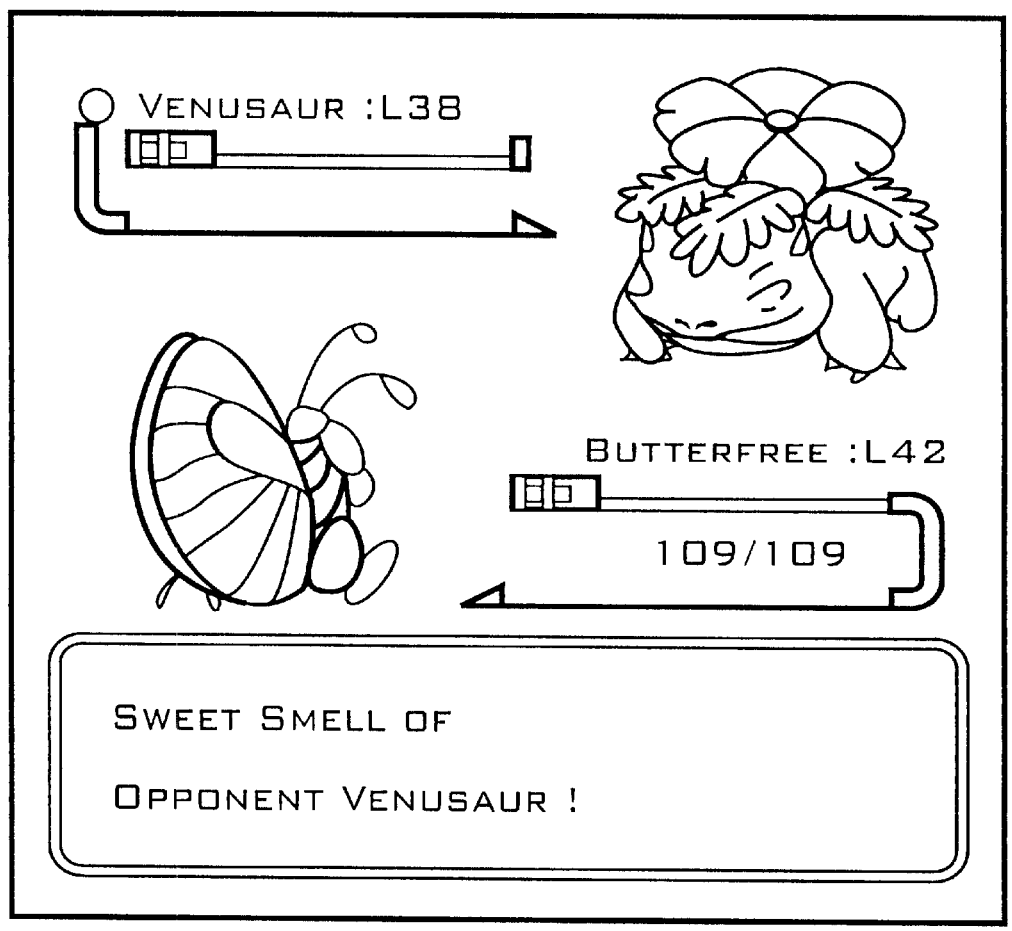
FIG. 20 is a diagram showing another example of battle game screen different from the one shown in FIG. 19.

To have a battle, the connector 29 and 29' of the portable game machines 20 and 20' are cable connected. Each player then designates a pokemon and puts it on a battle ground. Exemplary game screens therefor are shown in FIGS. 19 and 20, which will be described later.

Figure 9:
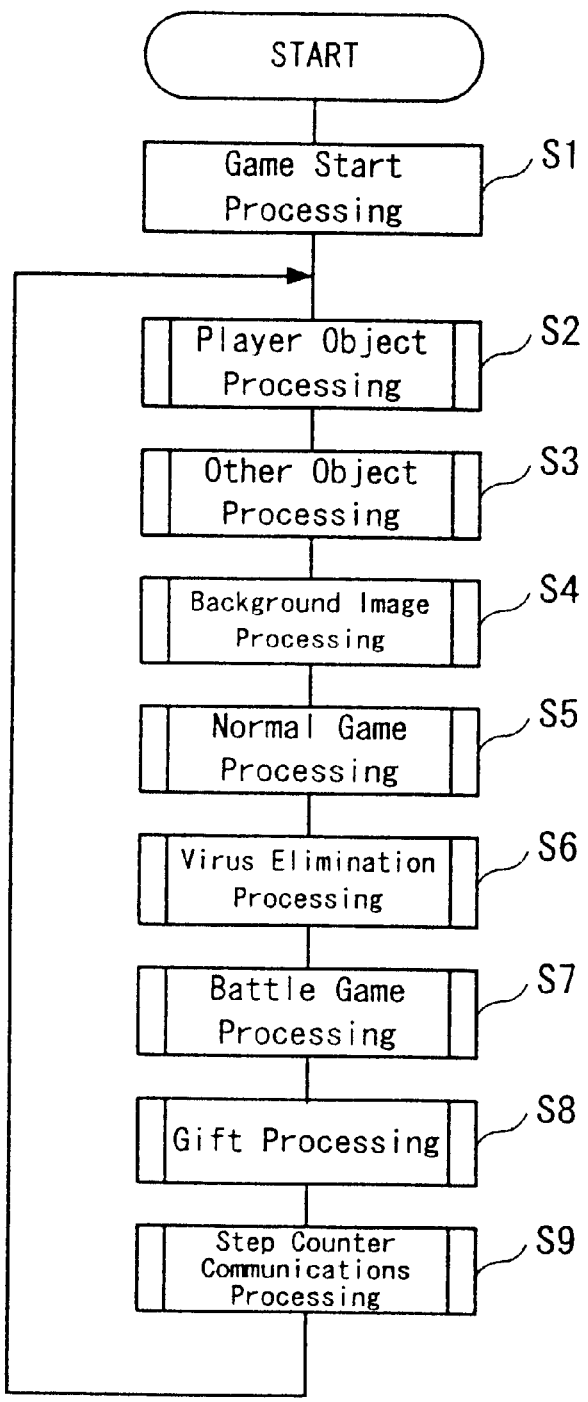
FIG. 9 is a flowchart showing the main operations of the image-display game system in FIG. 1.
Figure 10:
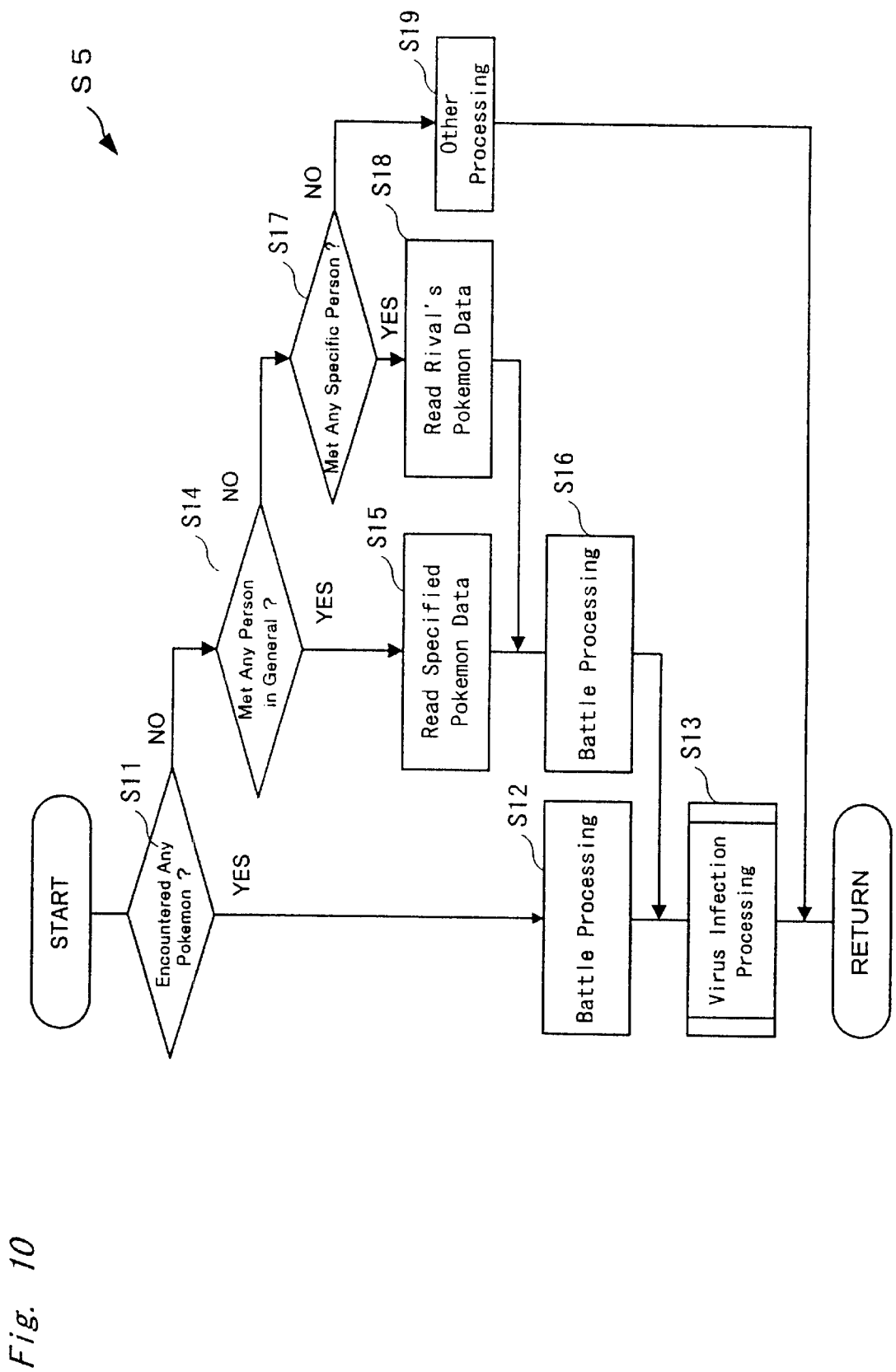
FIG. 10 is a detailed flowchart of a normal game processing subroutine shown in FIG. 9.
Figure 11:
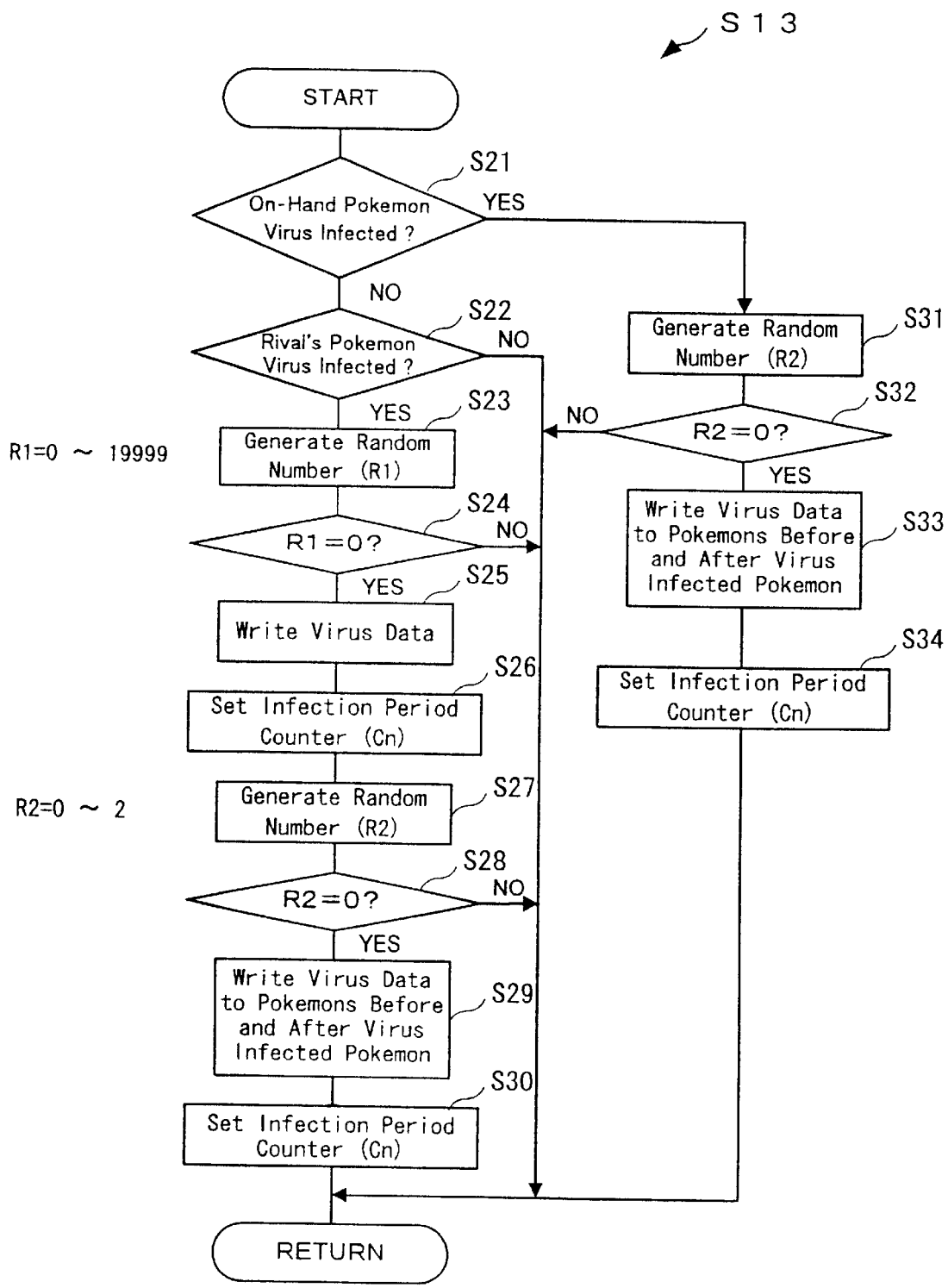
FIG. 11 is a detailed flowchart of a virus infection processing subroutine shown in FIG. 10.
Figure 12:
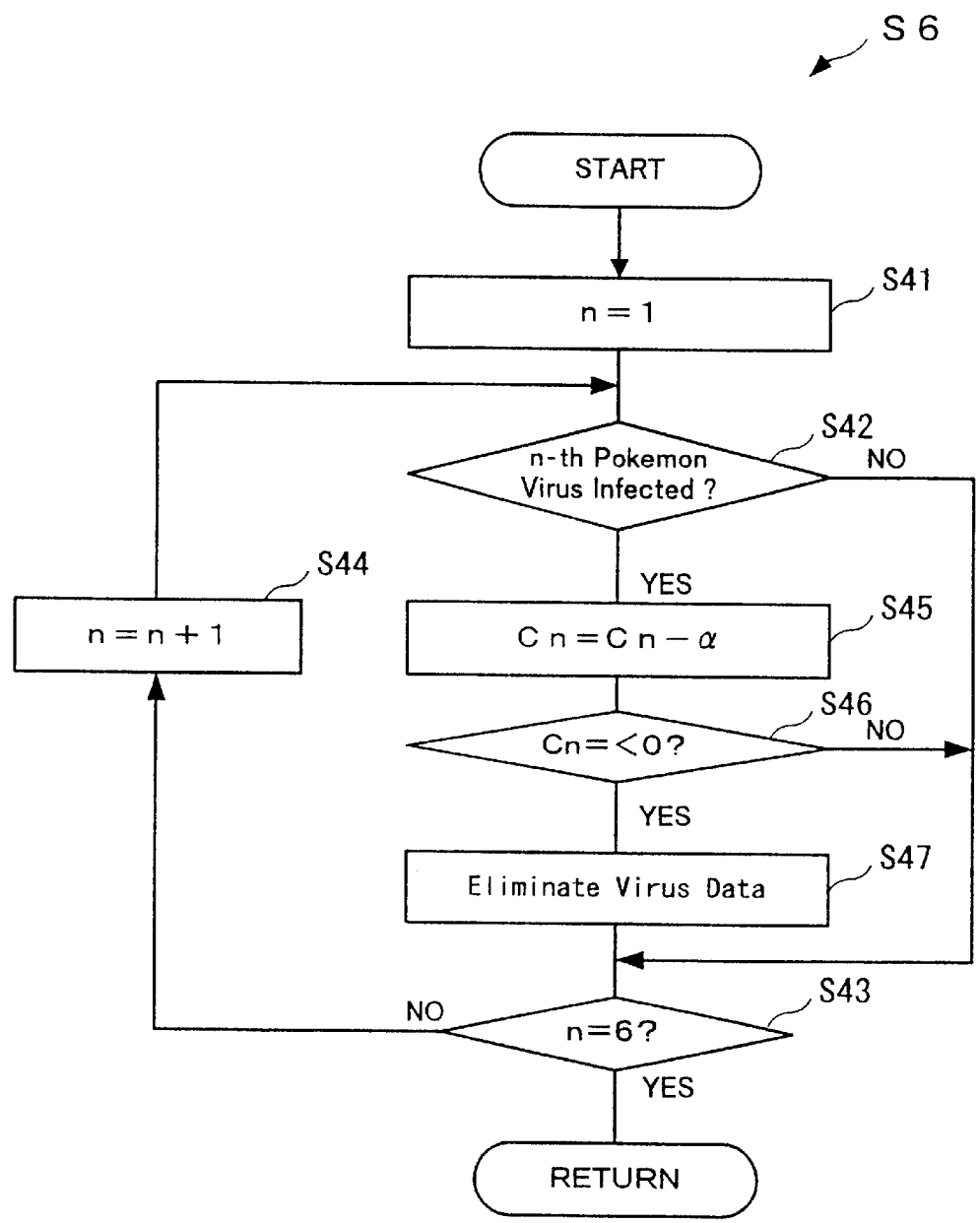
FIG. 12 is a detailed flowchart of a virus elimination processing subroutine shown in FIG. 9.
Figure 13:
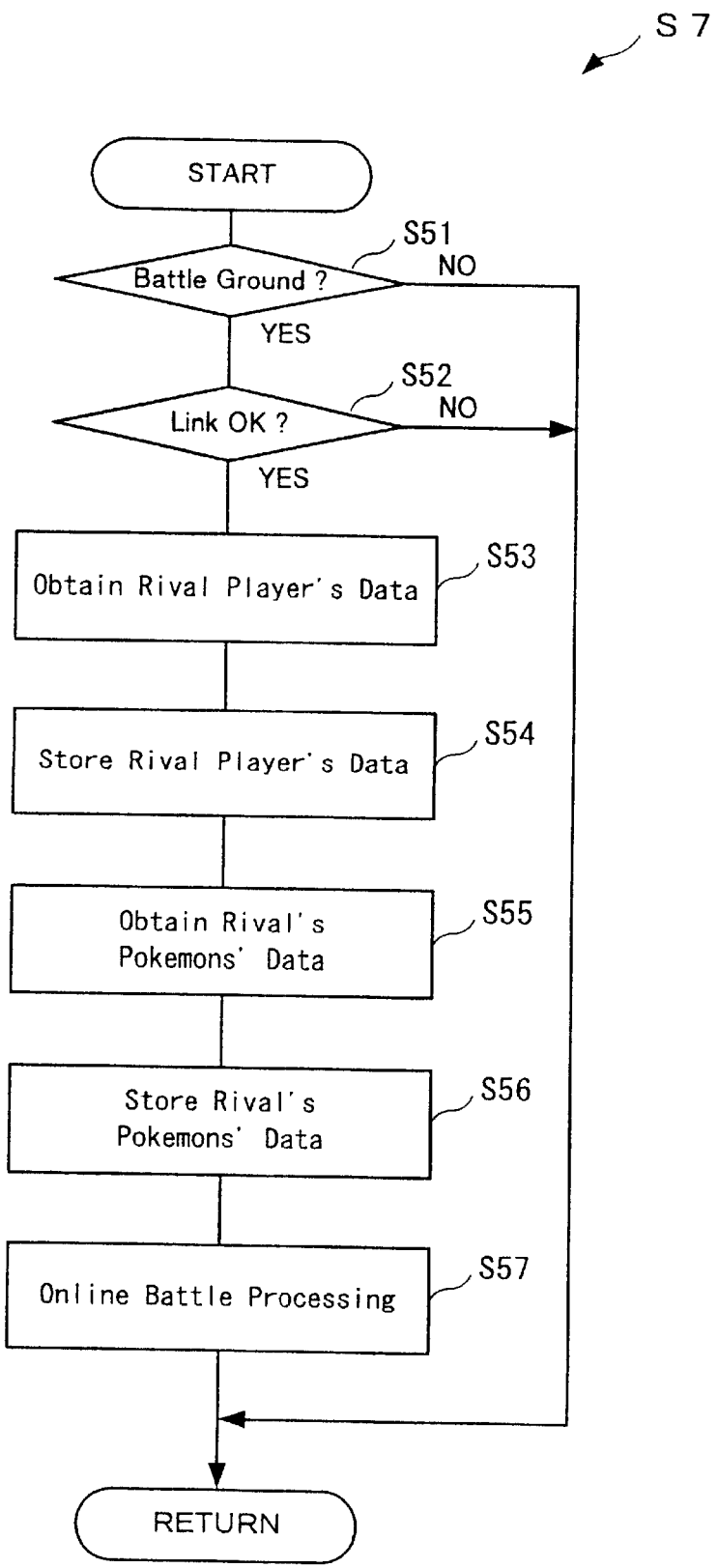
FIG. 13 is a detailed flowchart of a battle game processing subroutine shown in FIG. 9.
Figure 14:
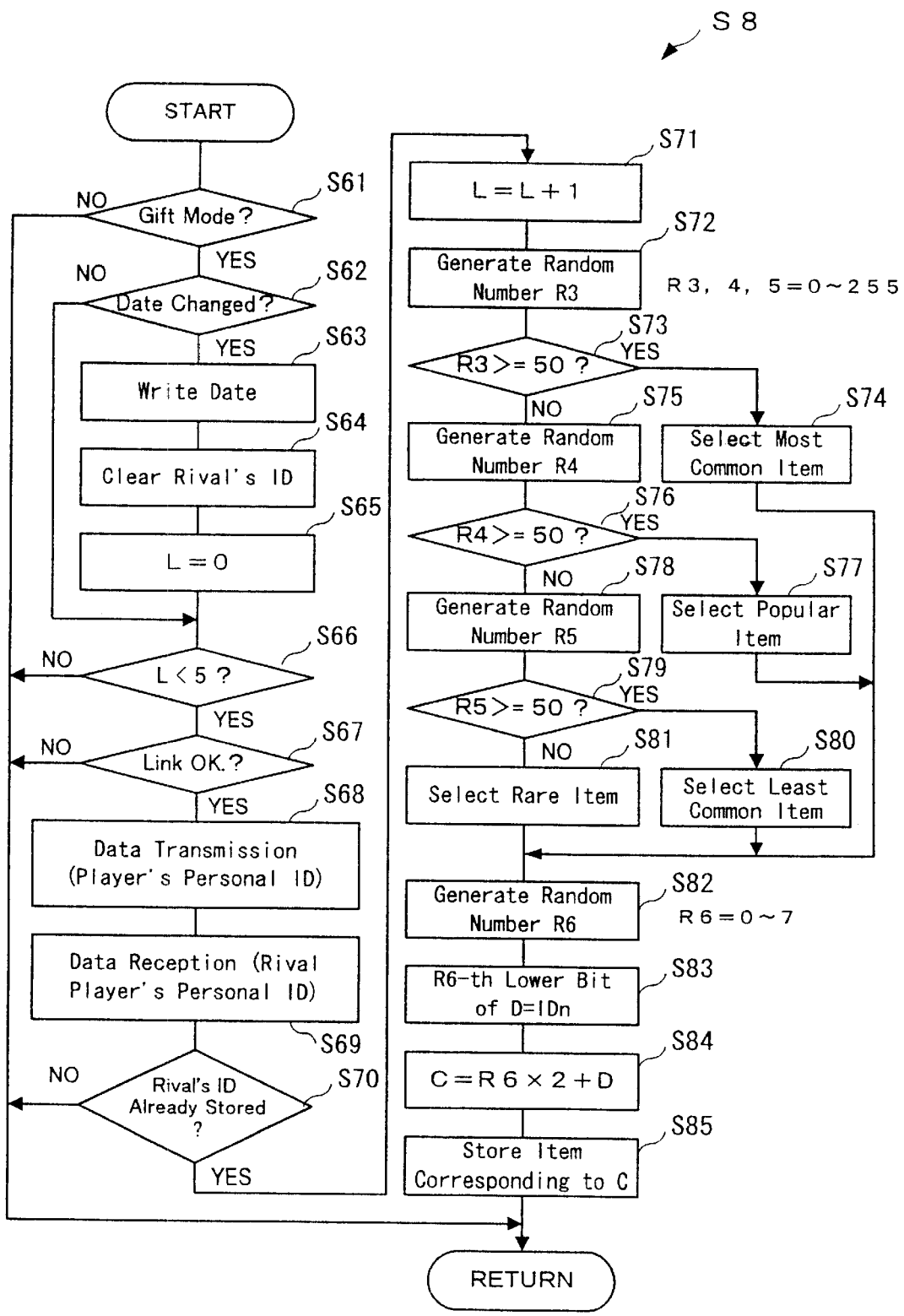
FIG. 14 is a detailed flowchart of a gift processing subroutine shown in FIG. 9.
Figures 16, 17:
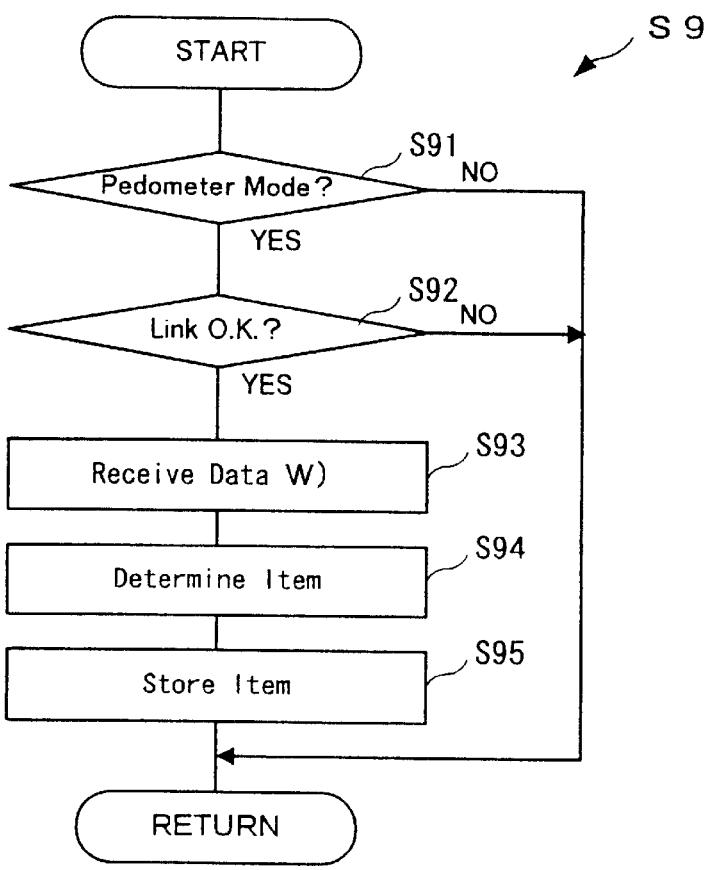
FIG. 16 is a detailed flowchart of a pedometer communications processing subroutine shown in FIG. 9.
FIG. 17 is a diagram in assistance of explaining an item determination method shown in FIG. 16.
Figure 18:
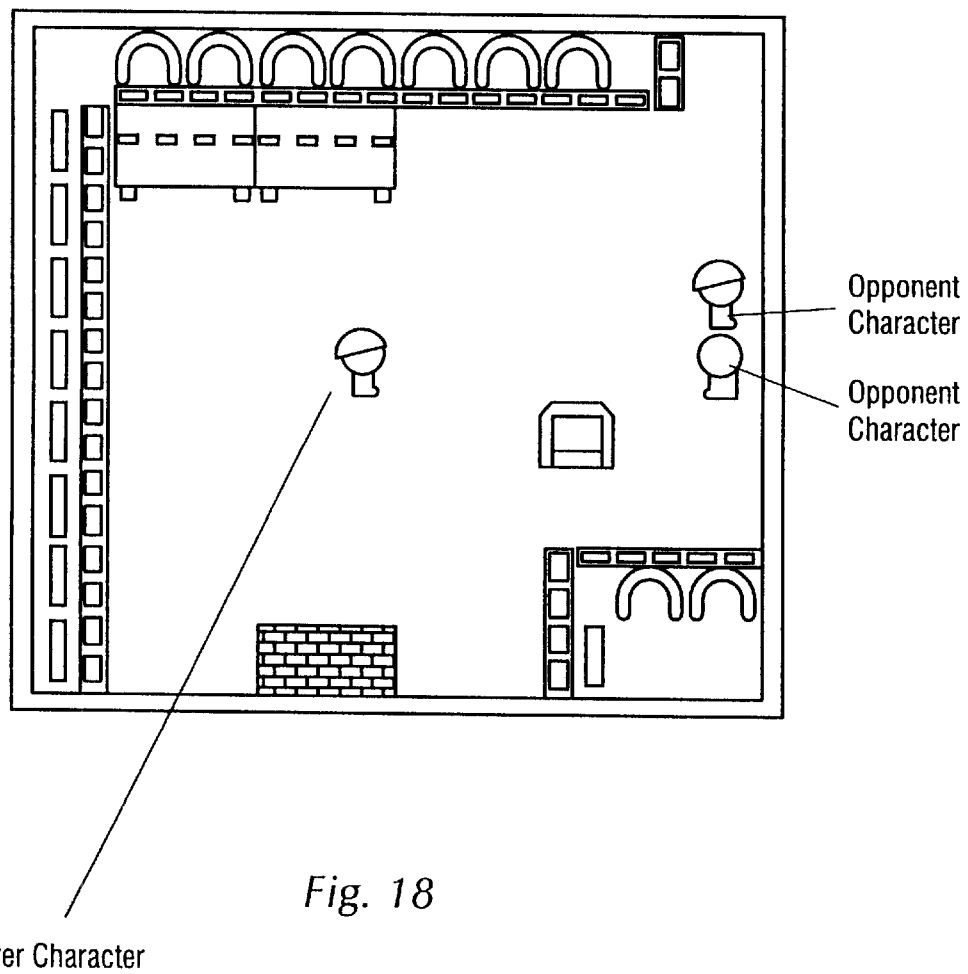
FIG. 18 is a diagram showing an example of normal game screen.

Described below is the operation of the game machine 20 with the cartridge 10A attached by referring to FIGS. 9, 10, 11, 12, 13, 14, 15, and 16. FIG. 9 is a flowchart for the entire process (main routine); FIG. 10 shows a flowchart for normal game processing; FIG. 11 shows a flowchart for virus infection processing; FIG. 12 shows a flowchart for virus elimination processing; FIG. 13 shows a flowchart for battle game processing; FIG. 14 shows a flowchart for mysterious gift processing in which the items (helping items) beneficial in the course of the game are presented through ID data communications; FIG. 15 shows the relationship between the numbers obtained by computation in the gift processing and the items; FIG. 16 shows a flowchart for communication processing made with the pedometer; and FIG. 17 shows the relationship between the step-number data provided by the communications processing made with the pedometer and the items.

FIGS. 18, 19, 20, and 21 show various game screens displayed in the course of the above game.

First of all, with reference to the flowchart for the entire process in FIG. 9, it is briefly described how the image-display game system of this embodiment operates.

In step S1, after the start switch 22c is depressed, the CPU 23 carries out processing with respect to a program stored in the ROM 11. In the following description, the CPU 23 is not mentioned for any program processing carried out thereby.

The procedure is started with the game start processing. In the game start processing, a mode selection screen is first displayed for mode commands' selection. The mode selection screen shows menus including a game start mode to start the game from initial position, a continue mode to start the game from the position discontinued when previously played, a mysterious gift mode to present the items (helping items) beneficial in the course of the game through ID data communications with other players, and a mode to perform data communications with the pedometer.

When the game start mode is selected, the internally-stored RAM 25 is cleared to start the game.

When the continue mode is selected, after the internally-stored RAM 25 is cleared, the RAM 12 in the cartridge 10A is read out for backup data indicating the previous game's process. The back-up data is written into the RAM 25. In this manner, the data stored on the RAM 25 at the start of the game is the backup data read out from the RAM 12, and is updated as the game proceeds.

In step S2, the player object (or character) processing subroutine is carried out. This processing allows the player object to move in response to the direction switch 22a, and to change in shape in response to the action switch 22c.

In step S3, this processing subroutine is carried out for objects but not for the player object. This processing allows opponent objects to come out or alley objects to be displayed, as the player objects moves, in accordance with the program setting.

In step S4, background image processing is carried out. This processing is for letting background images change as the player object moves or acts.

In the next step S5, the normal game processing subroutine is carried out. The details thereof are later described in reference to FIG. 10.

In step S6, the virus elimination (or removal) processing subroutine is carried out. This virus elimination processing is done with respect to any pokemon virus infected in later-described step S13 in FIG. 10. The virus-infected pokemon(s) are put back to the state before virus infection after a predetermined length of time has passed. The details of the virus elimination processing subroutine in this step are later described in reference to FIG. 12.

In the next step S7, the battle game processing subroutine is carried out. The battle game processing is done with respect to a mode of having an online battle with another player's game machine 20 connected through the cable 40, as exemplarily shown in FIG. 5. The details of this subroutine are later described in reference to FIG. 13.

In step S8, the gift processing subroutine is carried out. This gift processing subroutine is carried out when the helping items beneficial in the course of the game are presented through ID data exchange between the game machines 20 by using the infrared transmitter/receivers 16, as exemplarily shown in FIG. 6. The details of this subroutine are later described in reference to FIG. 14.

In step S9, the pedometer communications processing subroutine is carried out. This subroutine processing is done with respect to a mode of transmitting the step-number data from the pedometer-incorporated game machine 50 to the game machine 20 via the infrared transmitter/receivers 15 and 16, as exemplarily shown in FIG. 7. The details of this subroutine are later described in reference to FIG. 16.

With reference to FIG. 10, it is now described how the normal game processing in step S5 is carried out. In step S11, it is determined whether the main character has encountered any pokemon during his/her travel on the map. As exemplarily shown in the game screen of FIG. 18, if the main character runs into a pokemon (battle character), determination is so made.

Thereafter, in step S12, the battle processing is carried out. This battle processing allows pokemons (captured and trained), which are traveling with the main character as helping hands have battles with wild pokemons hiding along the way. By defeating the wild pokemon (battle character), the main character's pokemon increases its experience points or the wild pokemon is captured.

Thereafter, the virus infection processing subroutine is carried out in step S13. The details thereof are later described with reference to FIG. 11. The processing in step S13 is the end of this subroutine (S5), and the procedure goes to step S6 (FIG. 9).

If the main character is determined as not having encountered with pokemon in step S11, the procedure goes to step S14.

In step S14, it is determined whether the main character has met any person in general (rival called trainer, who captures and trains pokemons). If the main character is determined as having met any person in general during his or her travel on the map as exemplarily shown in the game screen of FIG. 8, the procedure goes to step S15.

In step S15, various data for up to six pokemons travelling with the main character and fighting for him or her is read out in order to be ready for a battle. Specifically, the data read out is the data stored in the areas 12a to 12d of the captured pokemon data region 12A under the 1st to 6th pokemon numbers stored in the on-hand pokemon storage region 12B.

The next processing in step S16 is carried out for a battle between the main character (player) and a rival trainer. Therein, images of both the rival trainer and the main character are displayed to indicate that the battle mode has commenced (FIG. 19 shows an exemplary game screen for the battle).

Figure 21:
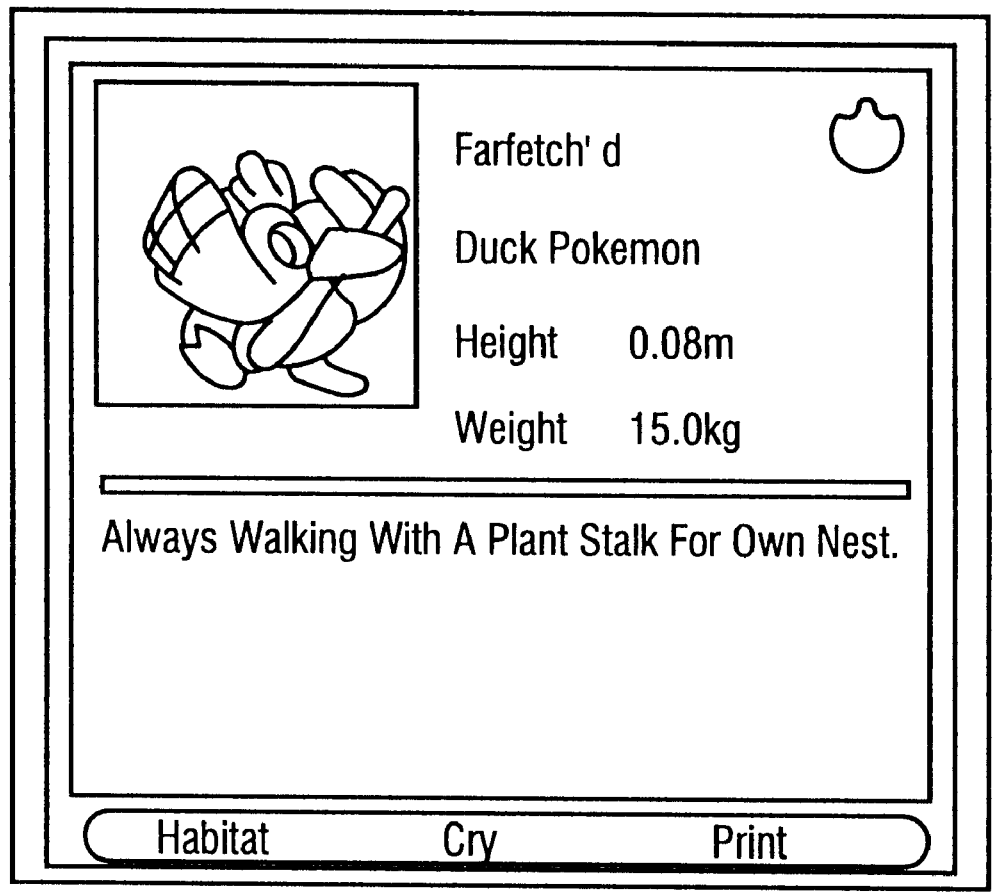
FIG. 21 is a diagram showing an example of screen displaying ability in the battle game of pokemons which the player possesses.

Thereafter, a pokemon is selected each from among those six to fight for the main character and the rival trainer, respectively, and the pokemons are displayed on the battle ground face to face (FIG. 20 shows an exemplary game screen for the battle). At this time, each pokemon is displayed with its name, hit point (HP), life, and the like. Additional messages indicate each action of the offensive side and defensive side. This message changes every time the offensive side and defensive side switch. As to such action for the battle, the player can see the pokemons' ability (status) by actuating a switch for screen change (FIG. 21 shows an exemplary game screen displaying such status). With the help thereof, the player can know how those six pokemons traveling with the main character will manage the battles. If the main character's pokemon successfully beats the rival trainer's during the battle, the pokemon is processed and increased in its experience point. Thereafter, the procedure goes to step S13, and the virus infection processing is carried out.

In step S14, if the main character is determined as not having met any person in general (trainer), the procedure goes to step S17.

In step S17, it is determined whether the main character has met any specific person (a trainer belonging to a player with whom a previous online battle occurred). If determined yes, the rival trainer's pokemon data is read out in step S18, and the procedure goes to step S16 for the battle processing. Then, the procedure goes to step S13. If this is the case, the rival trainer's name to be displayed is the other player's name stored in the area 12i (or parental ID data corresponding to the parental ID stored in the area 126). In this manner, by storing another player's pokemon data in the area 12i at the time of online battle, the player can later play the game as if having a real battle with the other player.

When determined No in step S17, the procedure goes to step S19 for miscellaneous processing and ends this subroutine (S5). The procedure is now through with this subroutine (S5), and goes to step S6 (FIG. 9).

Next, by referring to FIG. 11, the virus infection processing subroutine in step S13 is described. In this embodiment, a probability of pokemons' virus infection is set to one out of 20,000 battles. If a pokemon is infected, the preceding and subsequent two are virus-infected with a probability of 1/3. The length of time for virus infection (virus-infected endurance period or virus-infected persistent period) is set to vary according to the virus type. In this embodiment, virus infection is not detrimental to the player, and is welcomed as a conditional or environmental trick for accelerating pokemons' growth or evolution. The operation in step S13 is now described in detail below.

In step S21, it is determined whether the area 12c of the captured pokemon data region 12A has data (virus data) indicating any pokemon whose pokemon number is stored in the on-hand pokemon storage region 12B on the RAM 25 has been virus infected. If the area 12c is determined as having no data, that means no on-hand pokemon is virus infected, the procedure goes to step S22.

In step S22, it is determined whether any of the rival's pokemons has been virus infected. Such determination is made, in the online communication mode, based on the data stored in the area 12c corresponding to the pokemon numbers stored on the RAM 25 in the rival player's portable game machine 20. Other than in the online battle, the pokemons are set to virus infect through a naturally-virus-infected pokemon (Pokerus) with a probability of 120,000. When the rivals' pokemons are determined as not having been virus infected, the procedure is now through with the virus infection processing subroutine in step S13, and then goes to step S9 (FIG. 9).

In step S22, if any of the rival's pokemons is determined as having been virus infected, the procedure continues to step S23 and onwards. Therein, the player's on-hand pokemons are subjected to processing to be virus infected with a predetermined probability, and details thereof are as follows.

In step S23, the CPU 23 generates a random number R1 according to the program. For example, the random number R1 is an integer in the range from 0 to 19,999. Accordingly, it becomes possible to let any pokemon potential for virus infection infect with a probability of 1/20,000.

In step S24, it is determined whether the random number R1 is 0. If not, virus infection is determined as not having occurred, and the procedure is now finished with the virus infection processing subroutine (step S13 in FIG. 10, the flowchart in FIG. 11: steps S21 to S34). The procedure goes to step S9 (FIG. 9).

On the other hand, if the random number R1 is determined as being 0 in step S24, that means any of the on-hand pokemons are virus infected, the player's area 12c under the virus-infected pokemon's pokemon number is provided with data (virus data) in step S25. Since the virus is varied in type, the virus data (virus type data) specifies the virus type. Each virus type differs in virus-infected endurance period or consequence (impact or power) brought about thereby.

In step S26, such virus-infected endurance period ($C_n$; or virus-infected time and endurance period) is written into the miscellaneous area 12d of the captured pokemon data region 12A on the RAM 25 under the virus-infected pokemon's pokemon number, and accordingly a virus-infected period count value $C_n$ is set. This virus-infected period count value $C_n$ varies according to the virus type, and, for example, is set to "48" if the virus-infected endurance period is 48 hours. The virus-infected period count value is decreased by unit time, and when 0 is reached, the virus loses its infection power. This virus-infected period count value $C_n$ is not restricted to be hours but may be days, minutes, seconds, or any other predetermined countable value unit. Furthermore, the region for storing the count value is not restricted to the miscellaneous area 12d but any area on the RAM 25 as long as the area is relevant to the virus-infected pokemon(s).

In step S27, another random number R2 is generated based on the program. This random number R2 is an integer not less than 0 and not more than 2, for example, and is used to virus infect other pokemons ranked (arranged) immediately before and after the virus-infected pokemon with the probability of 1/3. In this embodiment, if the random number R2 is 0, those other pokemons ranked immediately before and after the virus-infected pokemon become virus infected.

In step S28, it is determined whether the random number R2 is 0. If the random number R2 is determined to be 0, that means some of the on-hand pokemons have been virus-infected (Yes in step S24), the procedure goes to step S29 to subject not infected on-hand pokemons predetermined in number to virus infection processing with the predetermined probability.

In step S29, the area 12c is provided with the virus data for the pokemon numbers assigned to those arranged immediately before and after the virus-infected pokemon among those six. In detail, assuming that the pokemon third in order in the on-hand pokemon storage region 12B is virus-infected, the pokemons second and fourth in order are also virus infected. Consequently, the virus data storage area 12c of the captured pokemon data region 12A is provided with the virus data for the pokemon numbers assigned to those second and fourth pokemons.

In step S30, in a similar manner to step S26, the virus-infected period data ($C_n$) is set to the area 12d of the captured pokemon data region 12A corresponding to the pokemon numbers assigned to the second and fourth pokemons. Herein, if the random number R2 is determined to be not 0 (i.e., R2=1 or 2) in step S28, those arranged immediately before and after the virus-infected pokemon are not virus infected. Accordingly, the procedure is now through with the virus infection processing subroutine (S13), and goes to step S9.

When any of the on-hand pokemons has been determined to be virus infected in step S21, the procedure goes to step S31 to subject the other on-hand pokemons in predetermined number to virus infection. The processing carried out in steps S31 to S34 is similar to that in steps S27 to S30, and those arranged immediately before and after the virus-infected pokemon are subjected to the virus infection processing with the predetermined probability. Thereafter, the procedure goes to step S9.

As already described above, the virus-infected pokemon starts to grow or evolve at a quicker rate, which is advantageous for the game process. To achieve that, when a pokemon is qualified for level-up in the normal game processing, a level up value to be added for one specification is set to vary depending on whether the pokemon has been virus infected. As another example of providing the virus-infected pokemon with some ability advantageous in the course of the game, depending on the virus type, the pokemon may suffer less damage when attacked by an opponent (or its defense power is increased) or its attack power may be increased.

Next, by referring to FIG. 12, the virus elimination processing subroutine in step S6 (FIG. 9) having the virus eliminated (removed) after the virus-infected endurance time has passed is described in detail. In step S41, a variable n is set to 1 for storage in a register region (not shown) on the RAM 25.

In step S42, the on-hand pokemon storage region 12B is selected for the pokemon number assigned to the 1st pokemon, which is equivalent to the variable n (1 at the beginning). Thereafter, it is determined whether the area 12c of the captured pokemon data region 12A has any virus data under the 1st pokemon's pokemon number. If no virus data is stored, the procedure goes to step S43.

In step S43, it is determined whether the variable n is 6. If not n=6, the procedure goes to step S44.

In step S44, n is incremented by 1, and the procedure returns to step S42. In step S42, it is determined whether the area 12c of the captured pokemon data region 12A has any virus data under the 2nd pokemon's pokemon number. If virus data is stored, the procedure goes to step S45.

In step S45, the virus-infected period count value (Cn) is decreased by a predetermined value ($\alpha$) (Cn=Cn−$\alpha$). As already described in step S26 (FIG. 11), the virus-infected period count value Cn indicates how long the pokemon specified by the pokemon number designated by the variable n has been virus infected. The predetermined value $\alpha$ corresponds to a length of time taken to repeat the processing in step S45. As an example, assuming that the virus-infected period count value Cn is exactly 48 hours and the processing in step S45 is repeated every second, the virus-infected period count value Cn is decreased by a second on the basis of $\alpha$=1 second.

In step S46, it is determined whether the virus-infected period count value Cn became less than or equal to 0, and if not yet, the procedure goes to step S43. In step S43, it is determined whether the variable n is 6. If not n=6, n is incremented by 1 in step S44, and the procedure returns to step S42.

As such, by repeating a series of operations including steps S42, S43, and S44, or a series of operations including steps S42, S45, S46, S43, and S44, each of the six pokemons is successively subjected to virus infection determination processing and processing of decreasing the virus infected time. When the variable n becomes 6 in step S43, each of the six pokemons is determined as being subjected to virus infection determination processing and processing of decreasing the virus infected time, and the procedure then goes to step S7.

When the virus-infected period count value Cn is determined as being less than or equal to 0 in step S46, the area 12c of the captured pokemon data region 12A on the RAM 25 is cleared of virus data for the pokemon number specified by the variable n. In other words, data indicating no virus infection is written thereto. Thereafter, in step S43, it is determined whether the variable n is 6, and if not n=6, n is incremented by 1 in step S44. The procedure then returns to step S42. The operation of steps S45, S46, S43, and S44 or the operation of steps S45, S46, S47, and S43 is repeated until each of the six pokemons is subjected to the virus elimination processing. The procedure then goes to step S7.

The operation of steps S45 and S46 may be alternatively done as follows. That is, assuming that a count value C1 indicates a time when the virus loses its power instead of the virus-infected period count value Cn, and $\alpha$ indicates a length of time after virus infection, determination is made in one step whether C1−$\alpha$ is less than or equal to 0.

A player who captured a virus-infected pokemon is free to lend it to another player within the virus-infected endurance time, and gets it back after the other player's pokemon is virus infected. Since the virus-infected pokemon is superior in ability compared with the non-virus infected, many players are eager to let their pokemons become virus infected. Accordingly, the player who luckily captured a virus-infected pokemon having a considerably low probability becomes busy with other players' requests for pokemon data exchange, increasing that player's popularity among other players. As such, the game is useful for cultivating friendship with other players.

Next, by referring to FIG. 13, the online battle game processing subroutine in step S7 is described in detail. For the online battle game, two game machines 20 are connected to each other through the cable 40, and each player selects the online battle mode on the mode selection screen.

In step S51, it is determined whether the place where the main character stands is a battle ground. If determined yes, the procedure goes to step S52.

In step S52, it is determined whether those two game machines 20 connected through the cable 40 are under normal link condition. If yes, the procedure goes to step S53.

If the place where the main character stands is determined as not the battle ground in step S51 (No) or if the link condition is determined as not normal in step S52 (No), the procedure skips the operation of later-described steps S53 to S57, and goes to step S8 of the main routine shown in FIG. 9.

In the online battle mode (i.e., Yes both in steps S51 and S52), the ID data is transmitted to/from the rival player's game machine 20 through the communications cable in step S53.

In step S54, the rival player's ID data is stored in the player's battle character data area of the battle data storage region 12C on the RAM 25.

In step S55, the rival player's pokemon data for six pokemons is read.

In step S56, the pokemon data for six pokemons is stored in the battle pokemon data area of the battle data storage region 12C on the RAM 25.

In step S57, the online battle processing is carried out. The procedure then goes to step S8 of the main routine.

So far, the system in which two game machines 20 are connected through the cable 40 is exemplarily described. As an alternative to the cable 40 and exemplarily shown in FIG. 6, those two game machines 20 can be connected through the infrared transmitter/receivers 16.

Next, by referring to FIG. 14 for the mysterious gift processing subroutine S8, it is described how the mysterious gift (also called helping item) is presented based on other player's ID code obtained through communications. Prior to starting the gift mode, two players place their game machines 20 such that the infrared transmitter/receivers 31 or the infrared transmitter/receivers 16 of the cartridge 10 are opposed to each other, establishing an environment for infrared communications. Next, each player selects a mode of presenting the mysterious gift through ID data communication or exchange between the game machines 20 on the above-described mode selection screen. In response thereto, the gift processing subroutine shown in FIG. 14 is started.

That is, in step S61, it is determined whether the gift mode is selected. If yes, the procedure goes to step S62.

In step S62, it is determined whether the date is changed. If yes, new date is written into a new data storage area 12i on the RAM 25 in step S63.

In step S64, the rival player's ID data in the area 12g is cleared.

In step S65, a register L (not shown, but included in the area 12i) is cleared for the number of players with whom ID communications or exchange is performed for the day (or 0 is written).

In step S66, it is determined whether the register L indicates 5 or smaller. Such determinations made in steps S62 and S66 maintain the upper limit allowed for presenting gift (or ID data communications) as 5 players in a day.

In step S67, it is determined whether the link for communications using the infrared transmitter/receiver is normally secured. If secured, the player's (his or her own) ID data is transmitted in step S68.

In step S69, the ID data (IDn) transmitted from the other player is received, and is written into the miscellaneous area 12g.

In step S70, whether the received ID data (IDn) is identical to the ID data (IDn) already stored in the area 12g is determined. If identical, the gift processing is terminated (returned) and the procedure goes to step S9. This is because the ID data exchange is allowed only once for the same player in a day. If determined as not identical, on the other hand, the value of the register L is incremented by 1 in step S71, and the number of players with whom ID data has been exchanged for the day is counted.

Furthermore, in the following steps S72 to S85, processing is carried out for providing rare items or items beneficial in the course of the game based on the ID data (IDn).

In detail, a random number R3 is generated in step S72. The random number generated in this step and R4 and R5 generated in steps S75 and S78 are all in the range of 0 to 255.

In step S73, it is determined whether the random number R3 is 50 or larger, and if determined as being 50 or larger, a most-common item group (group in the first column in FIG. 15) is selected. A probability for the random number being 50 or larger at the first stage is $205/255$ about ⅘, and accordingly the most-common item group is selected.

When the random number R3 is determined as smaller in step S73, a probability for such random number R3 is about ⅕. Therefore, as the procedure goes through step S76 and then S79, the probability will be multiplied by ⅕ every time the procedure reaches a stage of generating a random number (steps S75, 78, S82), and thus a more rare item is provided as the probability is decreased.

For this purpose, the random number R4 is generated in step S75. In step S76, it is then determined whether the random number R4 is 50 or larger, and if yes, a popular item group (group in the second column in FIG. 15) is selected.

If the random number R4 is smaller, the random number R5 is generated in step S78.

In step S79, it is determined whether the random number R5 is 50 or larger, and if yes, a least-common item group (group in the third column in FIG. 15) is selected.

If the random number R5 is smaller, a rare item group (group in the last column in FIG. 15) is selected in step S81.

In such manner, among the item groups classified according to the probability of random numbers R3, R4, and R5 in steps S74, S77, S80, and S81, an item to be presented based on the ID data (IDn) is determined through the later-described processing.

Furthermore, a random number R6 is generated in step S82. The random number R6 is data varied in type, and is assigned one of 8 numbers from 0 to 7. The random number is selected with a probability of 1/8.

In step S83, the area 12g is referred to for the other player's ID data (IDn) having ID data communications or exchange with, and based on the lower 8-bit data of the ID data, a variable D is determined. Specifically, out of the lower 8-bit of the ID data IDn, the value arranged in the numerical order specified by the random number R6 is set to the variable D. In FIG. 14, an expression is found as the random number R6-th lower bit of D=IDn.

In step S84, the variable D and the random number R6 as a part of the ID data (IDn) are computed with a predetermined equation (e.g., C=R6×2+D) so as to obtain an item number C.

In step S85, item data corresponding to the determined item number C is written into the item storage area 12h for storage. At the same time, an object and/or symbol of the item is displayed on the liquid crystal display 27 to let the player know what item is presented. Such items to be presented based on the communicated or exchanged ID data are shown in the right table in FIG. 15, and are preferably impossible or difficult to obtain through the normal game play.

Furthermore, so as to not always to present the same item to one ID data (IDn), the item type may be programmed to be based on data. Such data is obtained by dividing the ID data (IDn) into a plurality of bytes and inverting bit data in a byte specified by the random number or bit-shifting the ID data for the number of times of the random number. In order to determine the item type to be presented through ID data exchange with the other player, the ID data does not have to be correlated with the random number as described above, but it may be independently used to determine the item type.

As described in the foregoing, by making the items beneficial in the course of the game (helping data or items) available through the ID data communications or exchange with other players, the players desire to communicate/exchange ID data with other players to find the rare items, and thus communications/exchange increases. As a result, the players become communicative and enjoy each others company through sharing the same interest in the game, and even relatively unsocial kids want to participate.

Furthermore, since both of the ID data and random numbers are determination factors for item type, one ID data may not lead to the same item even if the player exchanges ID data with the same player on another day. Therefore, the players may not easily become bored, and thus can play the game repeatedly for a long time.

The system in which two game machines 20 are connected utilizing the infrared transmitter/receiver 16 has been exemplarily described. As an alternative to the infrared transmitter/receiver 16, as exemplarily shown in FIG. 5, those two game machines 20 can be connected through the cable 40.

Next, by referring to FIG. 16, the step-number data received through infrared communications from the pedometer-incorporated game machine 50 is operationally described. In the step-number communications mode, the player walks with the pedometer for the purpose of taking steps as many as possible, and he or she presents the number of steps to the main character or pokemons in the game. In this manner, the player can enjoy a feature not available by playing the game only with the game cartridge 10A. That is, the game available from the cartridge 10A is diversified to a further extent by being connected with the game machine different in type, stimulating the players to challenge the game.

Prior to starting the step-number data communications mode, as exemplarily shown in FIG. 7, the player places the infrared transmitter/receiver 51 of the pedometer-incorporated game machine 50 in such manner as to be opposed to the infrared transmitter/receiver 31 internally-provided in the game machine 20 or the infrared transmitter/receiver 16 provided to the cartridge 10A, and establishes an environment for infrared communications. Thereafter, the player selects the step-number data communications mode on the above-described mode selection screen (step S1). In response thereto, the pedometer communications subroutine in step S9 is started. Hereinafter, the operation thereof is described in detail with reference to FIG. 16.

In step S91, it is determined whether the pedometer communication mode is selected.

In step S92, it is determined whether the infrared transmitter/receivers 31 and 51 are securely linked. If securely linked, the procedure goes to step S93.

In step S93, the area 12i on the RAM 25 is provided, for storage, with step-number data W (or data relevant to the step number obtained by dividing the step-number data by a predetermined step number) transmitted from the pedometer-incorporated game machine 50.

In step S94, based on the equation shown in the table of FIG. 17, the item type is determined for the step-number data W.

In step S95, the item data is stored in the area 12h on the RAM 25. In this case, the larger the value of the step-number data W, the more rare the item type in the normal game play is presented according to the step-number data. Accordingly, the player will not stick in the house to play the game, rather exercises, e.g., walks, as a part of the game.

During or at the end of the game, a command "save data" is displayed, and if selected, the CPU 23 transfers, to the RAM 12 for writing, the data stored in the storage regions 12A to 12E on the RAM 25 in the game machine 20. In this manner, the RAM 12 is provided with the data relevant to the game process, and the data is backed up, for example by battery, (not shown) for the next play.

In step S91, on the other hand, if determined that the communications mode with the pedometer-incorporated game machine 50 is not selected, the steps S92 to S95 are skipped to terminate this subroutine (S9). The procedure then returns to the player object processing subroutine in step S2.

By referring to the table in FIG. 17, it is now briefly described how the item type presented relevant to the step-number data W is determined.

First, if the step-number data W is smaller than a predetermined value b1, an item b1 is presented. If the step-number data W is larger than the predetermined value b1 but smaller than a predetermined value b2, an item b2 is presented. If the step-number data W is larger than the predetermined value b2 but smaller than a predetermined value b3, an item b3 is presented. If the step-number data W is larger than the predetermined value b3 but smaller than a predetermined value b4, an item b4 is presented. If the step-number data W is larger than the predetermined value b4, an item b5 is presented. Although a predetermined value bN (where N is an arbitrary integer) is set to b1 to b4 in this embodiment, the range for the value may be increased or decreased as required or the predetermined value bN may be arbitrarily set. Accordingly, the game becomes more interesting.

Note that the description in the foregoing is made for a roll playing game, for example, a game played for capturing and training pokemons. However, the present invention is technically applicable to other type of games such as an action game or sports game. If another type of game such as an action game or sports game employs the present invention, the item type to be presented based on the ID data and/or the step-number data is changed according to the type of the game.

Furthermore, according to the type of the game, pokemons' virus infection may be altered to a disease that is contagious to person or animal favorable for the game process if infected, and such favorableness may also be appropriately altered.

Still further, in the above-described embodiment, although the image-display game device is exemplarily implemented by a portable game machine and game cartridge for using therewith, a video game machine connected to a television receiver may also implement the present invention. In such a case, the information storage medium may be implemented by a game cartridge, optical storage medium such as CD-ROM or DVD, or magnetic disk.

While the invention has been described in detail, the foregoing description is in all aspects illustrative and not restrictive. It is understood that numerous other modifications and variations can be devised without departing from the scope of the invention.

What is claimed is:

1. An image-display game system comprising an information storage medium and an image-display game device detachable from the information storage medium, said information storage medium including
a program store for storing a game program said image-display game device including:
an operation control member actuated by a player;
a temporary store including infection data regions where property data is stored for every character captured during the course of a game, and wherein virus related data indicating whether the character has been virus infected is stored;
a processor for carrying out information processing in response to said operation control member and based on said game program; and
a image-display for displaying an image obtained through processing carried out by said processor, wherein,
said processor is operable to change a displayed image in response to said operation control member; and to change the property data to be stored in said temporary store in response to the state of said operation control member; and to; changes in the characters' images based on the property data including data indicating if the captured character has been virus infected; said processor being operable to write the data indicative of being virus infected into at least one of said infection data regions corresponding to the captured characters stored in said temporary store, when a predetermined condition is satisfied.

2. The image-display game system as claimed in claim 1, wherein said image-display game device is connected to another image-display game device through a cable for data exchange, and wherein the processor of said image-display game device writes the data, based on the program stored in said program store, into at least one of said infection data regions corresponding to the captured characters stored in said temporary store when performing data exchange between the another image-display game device, when a character transferred from the another image-display device has been virus infected, and when the predetermined condition is satisfied.

3. The image-display game system as claimed in claim 1, wherein said predetermined condition is whether said characters have a battle with another character.

4. The image-display game system as claimed in claim 1, wherein said predetermined condition is whether a generated random number was in a predetermined value.

5. The image-display game system as claimed in claim 1, wherein said virus infected character is accelerated in its simulated growth.

6. A method of operating a game machine based upon a stored program which simulates the collection of characters of various types comprising the steps of:

collecting a character;

storing character property data indicative of whether a virus has infected the collected character;

determining whether at least one other character is infected by said virus; and controlling the progress of the game based at least in part upon whether a character has been infected by said virus.

7. A method according to claim 6, further comprising the step of:

receiving property data relating to a collected character from another game machine by communicating with the other game machine.

8. A method according to claim 6, wherein said step of determining whether at least one other character is infected by said virus includes the step of generating a random number.

9. A method according to claim 6, further including the step of storing data identifying the type of virus which has infected said character.

10. A method according to claim 6, further including the step of storing data indicative of the period of time over which a character is to be infected with said virus.

11. A method according to claim 6, further including the step of storing data for defining a character which grows and changes.

12. A method according to claim 6, further including the step of accelerating the rate at which characters infected with a virus evolve.

13. A method according to claim 6, further including the step of clearing virus data associated with a character after a predetermined period of time has expired.

14. A method according to claim 6, further including the step of providing a character having an associated virus with the capability to achieve superior game related results than a character not infected with a virus.

15. A method according to claim 6, further including the step of providing a character having an associated virus with the capability of infecting other characters with the virus.

16. A method according to claim 6, further including the steps of establishing a communication link with another player's game machine;

transferring a character having a virus to another player's game machine; and infecting at least one character of the other player's machine with said virus.

17. A method according to claim 6, further including the steps of establishing a communication link with another player's game machine;

transferring a character to another player's game machine; and engaging another player's character in a battle with the transferred character.

* * * * *